(12) United States Patent
Mazzagatti

(10) Patent No.: US 7,424,480 B2
(45) Date of Patent: Sep. 9, 2008

(54) SYSTEM AND METHOD FOR STORING AND ACCESSING DATA IN AN INTERLOCKING TREES DATASTORE

(75) Inventor: Jane Campbell Mazzagatti, Blue Bell, PA (US)

(73) Assignee: Unisys Corporation, Blue Bell, PA (US)

( * ) Notice: Subject to any disclaimer, the term of this patent is extended or adjusted under 35 U.S.C. 154(b) by 352 days.

(21) Appl. No.: 11/239,177

(22) Filed: Sep. 29, 2005

(65) Prior Publication Data

US 2006/0074947 A1 Apr. 6, 2006

Related U.S. Application Data

(62) Division of application No. 10/385,421, filed on Mar. 10, 2003, now Pat. No. 6,961,733.

(51) Int. Cl.
*G06F 1/00* (2006.01)
*G06F 17/00* (2006.01)

(52) U.S. Cl. ............... 707/100; 707/102; 707/6; 707/104.1; 707/101

(58) Field of Classification Search .......... None
See application file for complete search history.

(56) References Cited

U.S. PATENT DOCUMENTS 4,286,330 A 8/1981 Isaacson (Continued)

FOREIGN PATENT DOCUMENTS

EP 0 079 465 1/1985

(Continued)

OTHER PUBLICATIONS

Burton F. W. et al: "Multiple Generation Text Files Using Overlaping Tree Structures", Computer Journal, Oxford University Press, Surrey, GB. vol. 28, No. 4 Aug. 1985, pp. 414-416.

(Continued)

*Primary Examiner*—Tim Vo
*Assistant Examiner*—Jay A Morrison
(74) *Attorney, Agent, or Firm*—Richard J. Gregson; Robert P. Marley; Susan Murphy

(57) ABSTRACT

A tree-based datastore comprising a forest of interconnected trees is generated and/or accessed. The tree-based datastore comprises a first tree that depends from a first root node and may include a plurality of branches. Each of the branches of the first tree ends in a leaf node. Each leaf node may represent an end product, as described more fully below. A second root of the same tree-based datastore is linked to each leaf node representing an end product. Hence, the second root is essentially a root to an inverted order of the first tree, but the first tree is not duplicated. Finally, the tree-based datastore comprises a plurality of trees in which the root node of each of these trees is an elemental node, as described more fully below. The root node of each of these trees may be linked to one or more nodes in one or more branches of the first tree. The nodes of the tree-based datastore contain only pointers to other nodes in the tree-based datastore. The roots of the trees in the forest of trees comprising the tree-based datastore may be linked to data.

19 Claims, 18 Drawing Sheets

U.S. PATENT DOCUMENTS

| | | | |
|---|---|---|---|
| 5,245,337 | A | 9/1993 | Bugajski |
| 5,293,164 | A | 3/1994 | Bugajski |
| 5,592,667 | A | 1/1997 | Bugajski |
| 5,630,125 | A | 5/1997 | Zellweger |
| 5,634,133 | A | 5/1997 | Kelley |
| 5,829,004 | A | 10/1998 | Au |
| 5,894,311 | A | 4/1999 | Jackson |
| 5,918,224 | A * | 6/1999 | Bredenberg ............... 707/2 |
| 5,918,229 | A | 6/1999 | Davis et al. |
| 5,930,805 | A | 7/1999 | Marquis |
| 5,963,965 | A | 10/1999 | Vogel |
| 5,966,709 | A | 10/1999 | Zhang |
| 5,970,490 | A * | 10/1999 | Morgenstern ............. 707/10 |
| 5,978,794 | A | 11/1999 | Agrawal et al. |
| 5,983,232 | A | 11/1999 | Zhang |
| 5,995,971 | A * | 11/1999 | Douceur et al. ........... 707/102 |
| 6,018,734 | A | 1/2000 | Zhang |
| 6,029,170 | A | 2/2000 | Garger |
| 6,031,993 | A | 2/2000 | Andrews et al. |
| 6,102,958 | A | 8/2000 | Meystel |
| 6,115,715 | A | 9/2000 | Traversat et al. |
| 6,137,492 | A * | 10/2000 | Hoppe ...................... 345/420 |
| 6,138,115 | A | 10/2000 | Agrawal et al. |
| 6,138,117 | A | 10/2000 | Bayardo |
| 6,141,655 | A * | 10/2000 | Johnson et al. ............. 707/2 |
| 6,144,962 | A | 11/2000 | Weinberg et al. |
| 6,160,549 | A | 12/2000 | Touma et al. |
| 6,233,575 | B1 | 5/2001 | Agrawal et al. |
| 6,275,817 | B1 | 8/2001 | Reed et al. |
| 6,278,987 | B1 | 8/2001 | Reed et al. |
| 6,286,002 | B1 | 9/2001 | Axaopoulos et al. |
| 6,341,281 | B1 | 1/2002 | MacNicol et al. |
| 6,356,902 | B1 | 3/2002 | Tan et al. |
| 6,360,224 | B1 | 3/2002 | Chickering |
| 6,373,484 | B1 | 4/2002 | Orell et al. |
| 6,381,600 | B1 | 4/2002 | Lau |
| 6,389,406 | B1 | 5/2002 | Reed et al. |
| 6,394,263 | B1 | 5/2002 | McCrory |
| 6,442,561 | B1 * | 8/2002 | Gehrke et al. ............. 707/102 |
| 6,453,314 | B1 | 9/2002 | Chan et al. |
| 6,470,277 | B1 | 10/2002 | Chin et al. |
| 6,470,344 | B1 | 10/2002 | Kothuri et al. |
| 6,473,757 | B1 | 10/2002 | Garofalakis et al. |
| 6,477,683 | B1 | 11/2002 | Killian et al. |
| 6,499,026 | B1 | 12/2002 | Rivette et al. |
| 6,505,184 | B1 | 1/2003 | Reed et al. |
| 6,505,205 | B1 | 1/2003 | Kothuri et al. |
| 6,581,063 | B1 | 6/2003 | Kirkman |
| 6,591,272 | B1 | 7/2003 | Williams |
| 6,604,114 | B1 | 8/2003 | Toong et al. |
| 6,615,202 | B1 | 9/2003 | Ding et al. |
| 6,624,762 | B1 | 9/2003 | End, III |
| 6,635,089 | B1 | 10/2003 | Burkett et al. |
| 6,662,180 | B1 * | 12/2003 | Aref et al. ................. 707/6 |
| 6,662,185 | B1 | 12/2003 | Stark et al. |
| 6,681,225 | B1 | 1/2004 | Uceda-Sosa et al. |
| 6,684,207 | B1 | 1/2004 | Greenfield et al. |
| 6,691,109 | B2 | 2/2004 | Bjornson et al. |
| 6,704,729 | B1 * | 3/2004 | Klein et al. ................. 707/5 |
| 6,711,585 | B1 | 3/2004 | Copperman et al. |
| 6,745,194 | B2 | 6/2004 | Burrows |
| 6,748,378 | B1 | 6/2004 | Lavender et al. |
| 6,751,622 | B1 * | 6/2004 | Puri et al. ................... 707/101 |
| 6,760,720 | B1 | 7/2004 | De Bellis |
| 6,768,995 | B2 | 7/2004 | Their et al. |
| 6,769,124 | B1 | 7/2004 | Schoening et al. |
| 6,785,674 | B2 * | 8/2004 | Vu ............................. 707/3 |
| 6,799,184 | B2 | 9/2004 | Bhatt et al. |
| 6,804,688 | B2 | 10/2004 | Kobayashi et al. |
| 6,807,541 | B2 | 10/2004 | Bender et al. |
| 6,816,856 | B2 | 11/2004 | Baskins et al. |
| 6,826,556 | B1 | 11/2004 | Miller et al. |
| 6,831,668 | B2 | 12/2004 | Cras et al. |
| 6,868,414 | B2 | 3/2005 | Khanna et al. |
| 6,900,807 | B1 | 5/2005 | Liongosari et al. |
| 6,918,097 | B2 * | 7/2005 | Parisi ........................ 715/855 |
| 6,920,608 | B1 | 7/2005 | Davis |
| 6,931,401 | B2 | 8/2005 | Gibson et al. |
| 6,952,736 | B1 | 10/2005 | Westbrook |
| 6,965,892 | B1 | 11/2005 | Uceda-Sosa et al. |
| 7,027,052 | B1 | 4/2006 | Thorn et al. |
| 7,058,636 | B2 * | 6/2006 | Coldewey .................. 707/100 |
| 7,228,296 | B2 | 6/2007 | Matsude |
| 2002/0124003 | A1 | 9/2002 | Rajasekaran et al. |
| 2002/0138353 | A1 | 9/2002 | Schreiber et al. |
| 2002/0143735 | A1 | 10/2002 | Ayi et al. |
| 2002/0143783 | A1 | 10/2002 | Bakalash et al. |
| 2002/0188613 | A1 | 12/2002 | Chakraborty et al. |
| 2002/0191452 | A1 * | 12/2002 | Fujihara .................... 365/200 |
| 2002/0194173 | A1 | 12/2002 | Bjornson et al. |
| 2003/0009443 | A1 | 1/2003 | Yatviskly |
| 2003/0033279 | A1 | 2/2003 | Gibson et al. |
| 2003/0093424 | A1 | 5/2003 | Chun et al. |
| 2003/0105770 | A1 * | 6/2003 | MacLeod et al. ........ 707/103 R |
| 2003/0115178 | A1 | 6/2003 | Bobroff et al. |
| 2003/0120651 | A1 | 6/2003 | Bernstein |
| 2003/0187812 | A1 * | 10/2003 | Theimer et al. ............ 707/1 |
| 2003/0204513 | A1 | 10/2003 | Bumbulis |
| 2003/0204515 | A1 | 10/2003 | Shadmon et al. |
| 2003/0217335 | A1 | 11/2003 | Chung et al. |
| 2004/0107186 | A1 | 6/2004 | Najork et al. |
| 2004/0133590 | A1 | 7/2004 | Henderson et al. |
| 2004/0143571 | A1 | 7/2004 | Bjornson et al. |
| 2004/0169654 | A1 | 9/2004 | Walker et al. |
| 2004/0230560 | A1 | 11/2004 | Elza et al. |
| 2004/0249781 | A1 | 12/2004 | Anderson |
| 2005/0015383 | A1 | 1/2005 | Harjanto |
| 2005/0050054 | A1 | 3/2005 | Clark et al. |
| 2005/0060325 | A1 | 3/2005 | Bakalash et al. |
| 2005/0071370 | A1 | 3/2005 | Atschul et al. |
| 2005/0080800 | A1 | 4/2005 | Parupudi et al. |
| 2005/0097108 | A1 | 5/2005 | Wang et al. |
| 2005/0102294 | A1 | 5/2005 | Coldewey |
| 2005/0149503 | A1 | 7/2005 | Raghavachari |
| 2005/0171960 | A1 | 8/2005 | Lomet |
| 2005/0179684 | A1 | 8/2005 | Wallace |
| 2005/0198042 | A1 | 9/2005 | Russell et al. |
| 2005/0262108 | A1 | 11/2005 | Gupta |

FOREIGN PATENT DOCUMENTS

| | | |
|---|---|---|
| WO | WO 95/17783 | 6/1995 |
| WO | WO 99/34307 | 7/1999 |
| WO | WO 01/46834 | 6/2001 |
| WO | WO 02/063498 | 8/2002 |

OTHER PUBLICATIONS

Gschia-Yuan Teng & David L. Neuhoff, "An Improved Hierarchical Lossless Text Compression Algrithm", Proceedings 1995 Data Compression Conference.

Won Kim & Myung Kim, "Performance and Scaleability in Knowledge Engineering: Issues and Solutions", Journal of Object-Oriented Programming, vol. 12, No. 7, pp. 39-43, Nov./Dec. 1999.

Jeffrey O. Kephart & David M. Chess, "The Vision of Autonomic Computing", T.J. Watson Research Jan. 2003.

Linda Dailey Paulson, "Computer System, Heal Thyself", Aug. 2003.

Dave Gussow, "Headline: IBM-Enterprise Storage Server Shines at Colgate Palmolive", Jan. 6, 2003.

Caroline Humer, "IBM Creates Self-Healing Computer Unit", Jan. 8, 2003.

* cited by examiner

|  | 206 |
|---|---|
| BOT | 0 |
| A | 5 |
| B | 10 |
| C | 15 |
| ⋮ | ⋮ |
| T | 100 |
| ⋮ | ⋮ |
| EOT | 135 |

MEMORY 104

SYSTEM AND METHOD FOR STORING AND ACCESSING DATA IN AN INTERLOCKING TREES DATASTORE

RELATED APPLICATION

This application is a Divisional of our earlier filed U.S. patent application, Ser. No. 10/385,421, filed on Mar. 10, 2003, now U.S. Pat. No. 6,961,733, entitled SYSTEM AND METHOD FOR STORING AND ACCESSING DATA IN AN INTERLOCKING TREES DATASTORE, whose disclosure is incorporated by reference herein and which are assigned to the same assignee as this invention.

FIELD OF THE INVENTION

This invention relates to the field of computing and in particular to the field of storing and accessing data in datastores.

BACKGROUND OF THE INVENTION

One fundamental choice a developer makes when developing software is the selection of appropriate data structures to facilitate organizing and referencing data. Many different types of data structures are available, including linked lists, stacks, trees, arrays and others. Each data structure is associated with certain advantages and limitations.

One frequently-used data structure is the tree. One common form of tree is composed of a finite set of elements called nodes, linked together from a root to one or more internal nodes, each of which may be linked to one or more nodes, eventually ending in a number of leaf nodes. Typically, nodes closer to the root are parent nodes of the nodes farther away from the root. The nodes farther away from the root are called child nodes of the parent nodes. Data is typically stored in the nodes and can be referenced using the links from root to node to leaf and from parent to child and so on. Consequently, a hierarchical or sequential relationship may be attributed to data stored in the nodes of a tree structure. A hierarchical relationship can also be understood as a contextual relationship, each node being accessible within the context of its parent node.

One limitation of tree data structures is that typically, a tree can only represent one hierarchy. For example, a root node for sales activities could have a number of nodes depending from the root node, each node representing a particular salesman. Each salesman node could have child nodes, each salesman child node representing, for example, sales in a particular state. Hence, this tree could be easily accessed for state information within the context of salesman, that is, this tree could be used to efficiently answer the question: "What states does Salesman Bob sell in?". If, instead of accessing state data by salesman, salesman data within the context of state were needed, (that is, we want to answer the question: "What salesmen sell in Texas?"), another tree would have to be created, with nodes representing states depending from the root salesman activity, from which child nodes representing salesmen might depend. The alternative to creating another tree would be to traverse the entire tree to extract the desired information.

It would be helpful if one structure could record all possible contextual relationships within the data, thereby achieving efficiencies not possible with a standard tree data structure.

SUMMARY OF THE INVENTION

A tree-based datastore comprising one or more levels of forests of interconnected trees is generated and/or accessed. Each level of the tree-based datastore comprises a first tree that depends from a first root node and may include a plurality of branches. The first root may represent a concept, such as but not limited to, a level begin indicator. Each of the branches of the first tree ends in a leaf node. Each leaf node may represent an end product, as described more fully below. A second root of the same level of the tree-based datastore is linked to each leaf node of the first tree that represents an end product. Hence, the second root is essentially a root to an inverted order of the first tree or subset of the first tree, but the first tree is not duplicated. The second root may represent a concept, such as but not limited to, a level end indicator. Finally, the tree-based datastore comprises a plurality of trees in which the root node of each of these trees may include data such as a dataset element or a representation of a dataset element. This type of root node is referred to herein as an elemental root node. The elemental root node of each of these trees may be linked to one or more nodes in one or more branches of the unduplicated first tree. The non-root nodes of the tree-based datastore contain only pointers to other nodes in the tree-based datastore. The roots of the trees in the forest of trees comprising each level of the tree-based datastore are also comprised of pointers, however the root nodes may, in addition, contain data that represents information (i.e., contain data that is or represents data such as dataset elements or concepts such as level begin or level end indicators); all the other nodes of the tree-based datastore only point to other nodes and contain no data. In one embodiment of the invention the data is an integer that is associated with a character, a pixel representation, a condition such as begin indicator, end indicator, beginning of field indicator or the like, although the invention is not so limited. Multiple levels of the above-described tree-based datastore may be generated and accessed; the end products of a lower level becoming the elemental root nodes of the next level.

An interlocking trees datastore is generated and accessed. The datastore comprises a multi-rooted tree of asCase branches forming one asCase tree depending from a first root, called herein the primary root, and asResult branches forming multiple asResult trees depending from multiple roots. One special instance of an asResult tree comprises a root node that is linked to one or more end product leaf nodes of the asCase tree described above. Hence this asResult tree can easily access the branches of the asCase tree terminating in end products, in inverted order. This asResult tree can also be used to define elemental root nodes for the next level. These elemental root nodes may represent dataset elements for the next level, composed of the set of end products of the lower level.

The interlocking trees datastore may capture information about relationships between dataset elements encountered in an input file by combining a node that represents a level begin indicator and a node that represents a dataset element to form a node representing a subcomponent. A subcomponent node may be combined with a node representing a dataset element to generate another subcomponent node in an iterative subprocess. Combining a subcomponent node with a node representing a level end indicator may create a level end product node. The process of combining level begin node with dataset element node to create a subcomponent and combining a subcomponent with a dataset element node and so on may itself be iterated to generate multiple asCase branches in a level. AsResult trees may also be linked or connected to nodes in the asCase tree, such as, for example, by a root of an asResult tree pointing to one or more nodes in the asCase tree.

End product nodes of one level may be the elemental root nodes representing dataset elements that are combined to generate a next level of subcomponents. This process can be repeated any number of times, creating any number of levels of asCase trees. Additionally, elemental root nodes of a level may be decomposed to generate lower level nodes and roots. End product nodes of one level become the elemental root nodes of the next level through a special instance of an asResult tree of the lower level, that is, the asResult tree of the lower level having the root node that represents the lower level ending indicator. The asResult tree of the lower level having the root node that represents the lower level ending indicator, thus, is a second root into an inversion of the asCase tree of the lower level.

In one embodiment of the invention, as nodes are created, asCase and asResult links are essentially simultaneously generated at each level. AsCase branches are created by the generation of the asCase links as the input is processed. The asCase branches of the asCase tree on each level provide a direct record of how each subcomponent and end product of the level was created through the sequential combination of nodes representing dataset elements into subcomponents and so on to end products. The branches of the asCase tree also represent one possible hierarchical relationship of nodes in the tree.

The generation of the asResult links creates a series of interlocking trees, each of which depends from a separate root. There may be multiple roots of this type in a level. This has the result of recording all the other relationships between the dataset elements encountered in the input. The aforementioned information is captured by the structure of the forest of interlocking trees that is built rather than explicitly stored in the nodes of the trees, so that in effect, the data that is received as input determines the structure of the forest of interlocking trees that is built. The structure of the forest of asResult trees ensures that the information so stored can be accessed in any other context required. Hence, the datastore is self-organizing, as will become evident from the description below.

BRIEF DESCRIPTION OF THE DRAWINGS

The foregoing summary, as well as the following detailed description of embodiments of the invention, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 1:
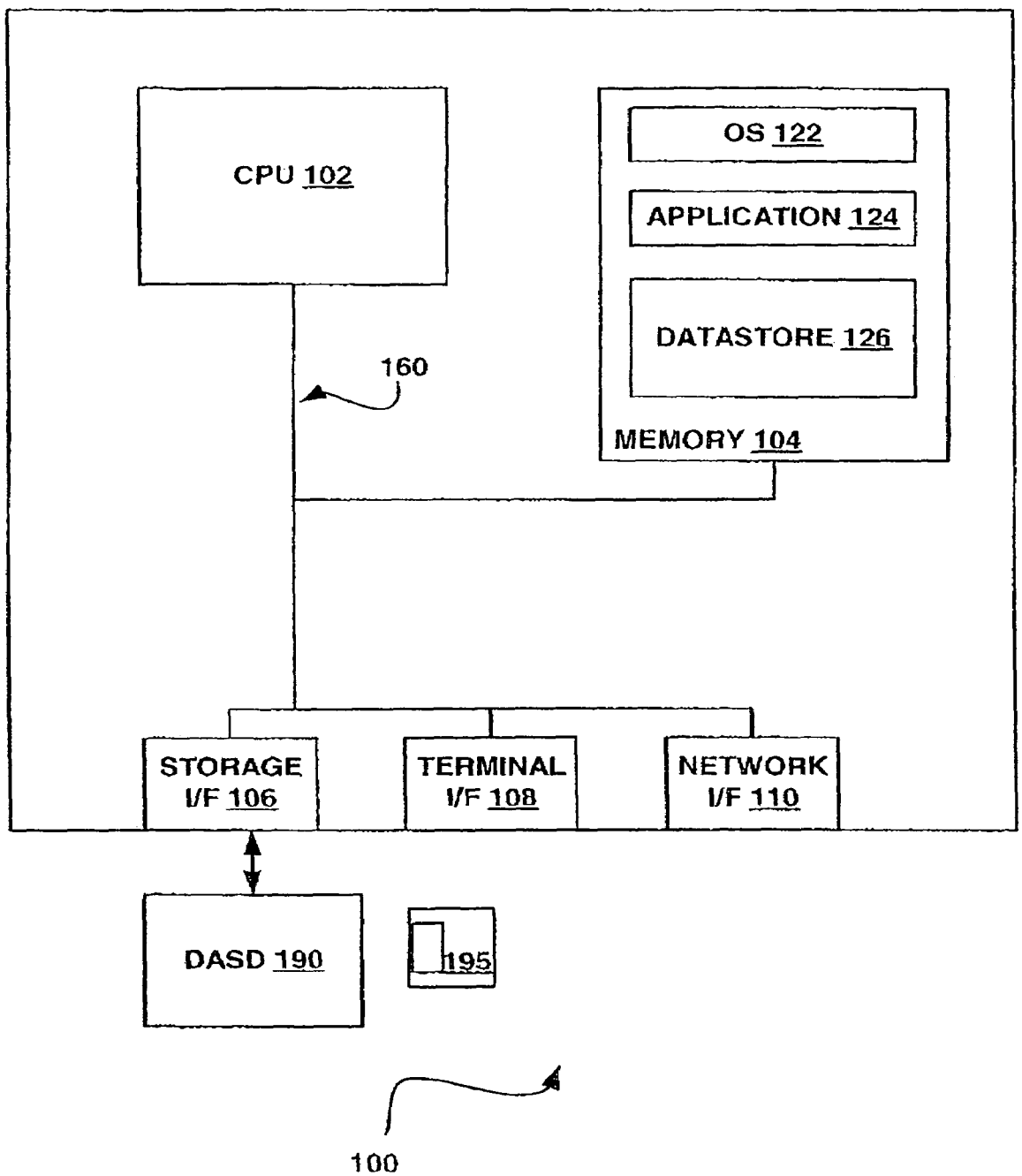
FIG. 1 is an exemplary computing environment in which aspects of the invention may be implemented.

The system and method described below creates a datastore comprising at least one level of forests of interconnected trees. The forest of interconnected trees of each level of the datastore captures information about combinations of nodes representing a level begin and a dataset element (creating a subcomponent node) or a subcomponent node and a dataset element node or a subcomponent node and a node representing a level end indicator in an iterative process that results in the generation of a single asCase tree composed of nodes linked by asCase tree branches and multiple asResult trees. The nodes of the asCase branches depend from a first root. For example, referring to FIG. 3a, nodes 302, 312, 314 and 316 is an exemplary asCase tree depending from a first begin indicator root 302. AsResult trees include the following trees: node 306 and 312 (one asResult tree), nodes 304 and 314 (a second asResult tree), nodes 308 and 316 (a third asResult tree) and nodes 310 and 318 (a fourth asResult tree). The fourth asResult tree is a special instance of asResult tree because the root (node 310) represents an end indicator.

Each branch of the asCase tree of a given level begins with a combination of a node representing a level begin indicator and a node representing a dataset element into a subcomponent node. A subcomponent node may be iteratively combined with a dataset element node into another subcomponent node. A subcomponent may be combined with a node representing a level end indicator to create an end product node. This process can be repeated and may result in the formation of multiple asCase tree branches depending from the first root.

For example, if the indivisible elemental components of a particular interlocking trees structure are alphanumerics, subcomponents may be combinations of letters that are not words and end products may be words. Alternatively, subcomponents may be combinations of alphanumerics that comprise a partial stock number or order number and end products may be a complete stock or order number, to mention just two possible uses of many, of an alphanumeric universe of input applied to the invention.

End products of one level may be the dataset elements of a next level. The end product dataset elements may be used to generate a next level of subcomponents, in the same fashion that the dataset elements of the lower level are used to create lower level subcomponents and end products. For example, in the particular interlocking trees structure described above, the end products of one level (words) can be the dataset elements from which a higher level end product (a sentence) may be created. This process can be repeated any number of times, creating any number of levels of asCase trees in the datastore.

To continue the example described above, a higher level, using words as the level dataset elements, may comprise sentences. Sentences may be combined to create paragraphs (a higher level yet), and so on. Additionally, dataset elements of a higher level may be decomposed to generate lower levels of the interlocking trees datastore. In one embodiment of the invention, the asResult tree that initiates from the level end indicator is used to define the dataset elemental of the next level. The end indicator is a second root into an inverted order of the interlocking trees datastore as defined by the asCase tree in one embodiment of the invention.

As nodes are created, asCase and asResult links may be simultaneously generated at each level. An asCase link represents a link to the first of the two nodes from which a node is created. It will be appreciated that asCase branches of the asCase trees may be created by the generation of the asCase links as the input is processed. The asCase branches of each level provide a direct record of how each subcomponent and end product of the level was created. Hence the asCase branches can be used for any purpose for which knowing how subcomponents and end products are created is useful. If, for example, the input to the interlocking trees generator comprises a universe of correctly spelled words, the resulting asCase links of the generated interlocking trees could be used as a spelling checker, to list just one example out of many possible examples of the utility of the datastore.

Additionally, the branches of the asCase tree also represent one possible hierarchical relationship of nodes in the asCase tree. For example, if the data received by the interlocking trees generator is "Tom sold 100 PA. Bill sold 40 NJ." the asCase tree generated comprises a view of the data in a "state information within the context of salesman" context or hierarchy.

An asResult link represents a link to the second of the two nodes from which a node is created. The generation of the asResult links creates a series of interlocking trees where each of the asResult trees depend from a root comprising a dataset element. This has the result of recording all encountered relationships between the elementals and asCase trees in the datastore. That is, the asResult trees capture all possible contexts of the nodes of the interlocking trees. The asResult trees can be used for any purpose for which knowing the context or relationships between nodes is useful. If, for example, the input to the interlocking trees datastore generator comprises a universe of sales data including salesman name, day of the week, number of items and state, the resulting asResult links of the generated interlocking trees datastore could be used to extract information such as: "What salesmen sell in a particular state?" "How many items were sold on Monday?" "How many items did Salesman Bob sell on Monday and Tuesday?" and the like, —all from the same interlocking trees datastore, without creating multiple copies of the datastore.

Subcomponents and end products may be classified using the information stored in the asResult trees. It will be appreciated that the aforementioned information is actually stored by the structure of the interlocking trees datastore that is built rather than explicitly stored in the subcomponent and end product nodes of the tree. Because only the root nodes of the interlocking trees datastore may include data, asResult links can be followed back to the root node to determine if the subcomponent or end product belongs to the class of data represented by the root node. It will be further appreciated that this feature causes the datastore to be self-organizing, in accordance with the process described below. If, for example, the input to the interlocking trees datastore generator were "CAT TAB", information stored in the structure of the resultant interlocking trees datastore could be used to determine that both end products "BOT-C-A-T-EOT" and "BOT-T-A-B-EOT" contain the elemental "A". or said another way, the class of subcomponents/end products containing "A" include "BOT-C-A-T-EOT" and "BOT-T-A-B-EOT". Furthermore, by following the asCase links of the nodes containing "A", other subcomponents and end products containing "A" can be found along the branch of the asCase tree.

In one embodiment of the invention, links between nodes are bidirectional. For example, a root node representing the letter "A" may include a pointer to a node BOT-C-A in node A's asResultList while the node BOT-C-A may include a pointer to the node A as its asResult pointer and so on.

In another embodiment of the invention, links between nodes are unidirectional. For example, in this embodiment, node BOT-C-A includes an asCase pointer to node BOT-C and an asResult pointer to the root node representing A but the root node A does not include a pointer to node BOT-C-A in its asResultList. One of skill in the art will recognize that although information concerning which nodes are of class A can still be determined, doing so may require a search of all nodes.

Exemplary Computing Environment

FIG. 1 is a block diagram of an exemplary computer system 100 in which aspects of the present invention may be implemented. Computer system 100 may be any suitable system, such as but not limited to a mainframe, minicomputer, IBM compatible personal computer, Unix workstation or network computer. One skilled in the art will appreciate that the apparatus of the present invention may apply to any computer system including but not limited to a multi-user computer system or single user computer. As shown in FIG. 1, computer system 100 comprises central processing unit (CPU) 102 connected to main memory 104, auxiliary storage interface 106, terminal interface 108, and network interface 110. These system components are connected via system bus 160. Auxiliary storage interface 106 is used to connect storage devices, such as but not limited to DASD devices 190, storing data on a disk such as but not limited to disk 195, to computer system 100.

Main memory 104, encompassing the entire virtual memory of computer system 100, includes an operating system 122 and an application 124, and may also include an interlocking trees datastore 126. The interlocking trees datastore 126 may be used to provide data storage that can be quickly searched for data in multiple contextual modes without requiring a duplication of data. Computer system 100 may use well-known virtual addressing mechanisms that allow the programs of computer system 100 to behave as if they have access to a large single storage entity rather than access to multiple, smaller storage entities such as main memory 104 and DASD devices 190. Hence, while operating system 122, application 124, and interlocking trees datastore 126 are shown to reside in main memory 104, those skilled in the art will recognize that these elements are not necessarily all completely located in main memory 104 at the same time.

While computer system 100 is shown to include only a single CPU and system bus, one skilled in the art will understand that the present invention may be implemented using a system that includes multiple CPUs and/or buses. Terminal interface 108 may be used to connect one or more terminals to computer system 100. The referenced terminals may be dumb terminals or fully programmable workstations and may be employed to enable system administrators and users to communicate with computer system 100.

Network interface 110 may be used to connect other computer systems and/or workstations to computer system 100. The network to which network interface 10 interfaces may be a local area network (LAN), wide area network (WAN), an internet, extranet or the Internet, or any other suitable network. Operating system 122 may be an operating system such as OS/2, WINDOWS, AIX, UNIX, LINUX or any other suitable operating system.

Application program 124 can be any type of application program which accesses data stored in interlocking trees datastore 126. Thus, the application could comprise a data analytics application, data warehousing application, intrusion detection system, to name several examples, although the invention is not limited thereto.

Interlocking trees datastore 126 provides a data storage structure that enables users to access the same datastore to obtain information associated with any context. The term data, as used herein can include any type of computer stored information such as but not limited to numbers, text, graphics, formulas, tables, audio, video, multimedia or any combination thereof. Interlocking trees datastore 126 can be implemented as part of application 124, as part of operating system 122 or as a separate datastore product that can be adapted to provide data storage for a wide variety of applications.

While the present invention is described in the context of a fully functional computer system, one of skill in the art will appreciate that the present invention is capable of being distributed as a program product in a variety of forms, and that the present invention applies equally, independent of the particular type of signal bearing media that carry out the distribution. Examples of media carrying such signals include but are not limited to floppy disks, hard drives, CD ROMs, digital and analog communication links over electrical, optical, wireless or other suitable mediums.

System and Method for Generating and Accessing an Interlocking Trees Datastore

Figure 2A:
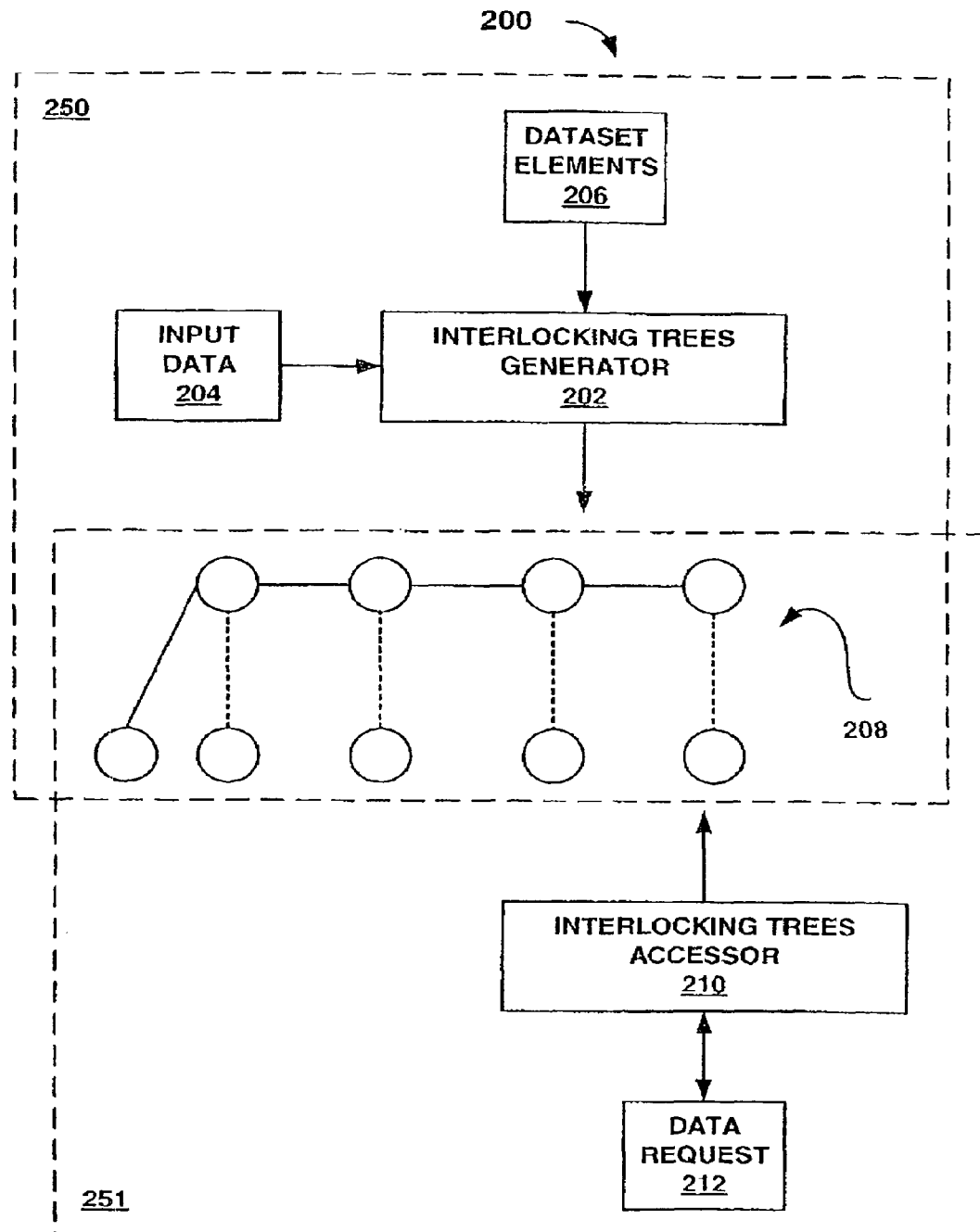
FIG. 2a illustrates an exemplary system for generating and accessing data from an interlocking trees datastore in accordance with one embodiment of the invention.

FIG. 2a illustrates an exemplary system 200 for generating and accessing data from a forest of interlocking trees comprising a datastore in accordance with one embodiment of the invention. A subsystem 250 for generating the interlocking trees datastore in one embodiment includes an interlocking trees generator 202, a set of dataset elements 206, and input data 204 from which exemplary interlocking trees datastore 208 is generated. Alternatively, the set of dataset elements 206 may be derived from input data 204.

A subsystem 251 for accessing information from the interlocking trees datastore 208 may include the interlocking trees datastore 208, as described above, and/or an interlocking trees datastore accessor 210 for receiving data requests 212, processing the data requests 212 and returning the requested information.

Figure 2B:
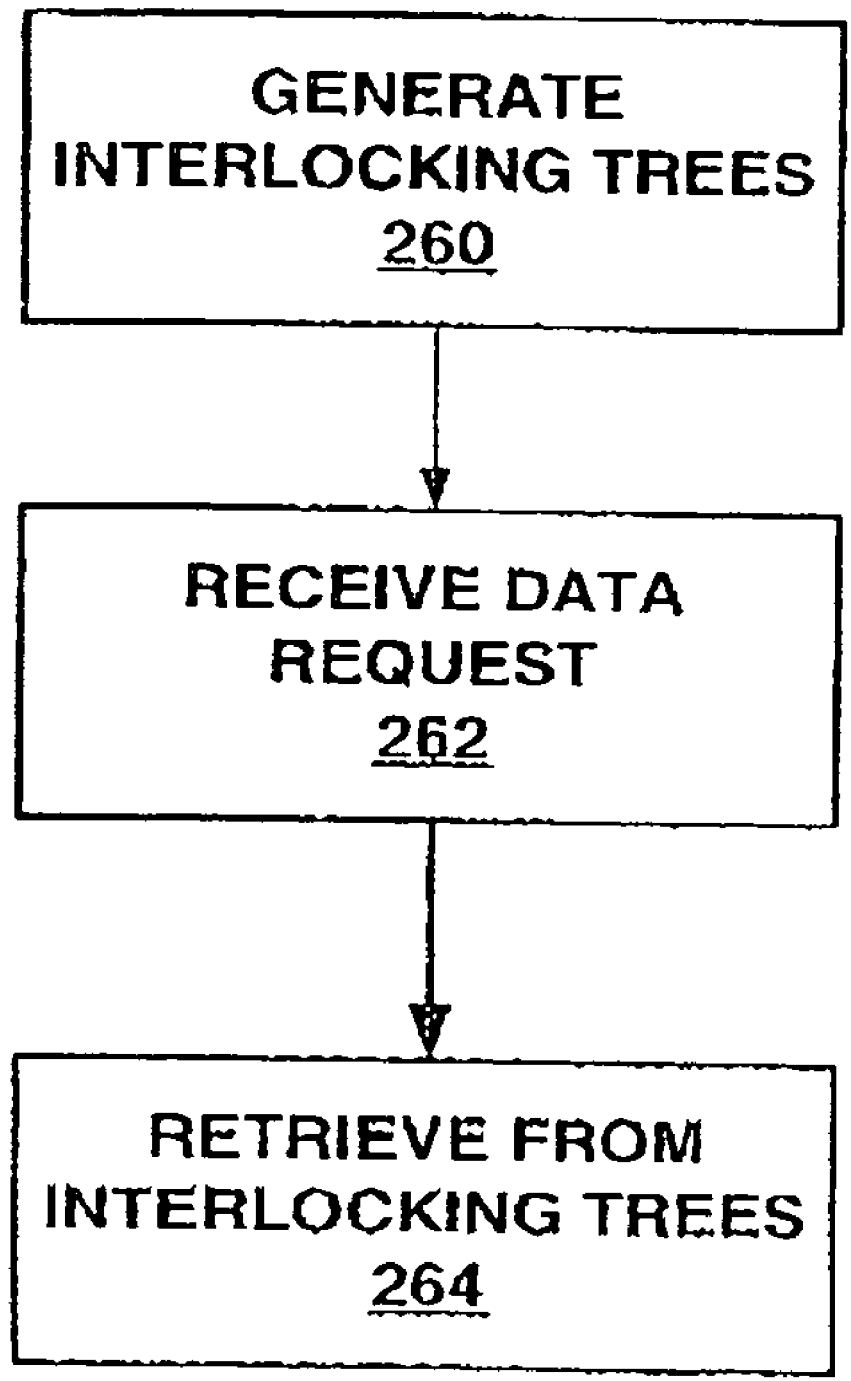
FIG. 2b illustrates an exemplary method for generating and accessing information from an interlocking trees database.

FIG. 2b illustrates an exemplary method for generating and accessing information from an interlocking trees database. At step 260 an interlocking trees datastore is generated, as described more fully below. At step 262, a request for information from the interlocking trees datastore is received. At step 264, the information is retrieved from the interlocking trees datastore.

Generation of an Interlocking Trees Datastore

Assume, for example, that the input data 204 comprises a stream of alphanumeric characters representing a word (e.g., "CAT "). Dataset elements 206 in this case may be the set of letters in the alphabet, and may include one or more characters to represent a delimiter or beginning-of-word/end-of-word concept. Delimiters may include alphanumeric characters such as but not limited to blank (" "), comma (","), and period (".").

Interlocking trees datastore 208 includes a number of roots, a number of non-root nodes and a number of links or connections between non-root nodes or between a root and a non-root node. Each root and non-root node of interlocking trees datastore 208 includes a pair of pointers (case pointer and result pointer) and a pair of list pointers (a pointer to an asCaseList and a pointer to an asResultList). Roots may include, in addition, data representing a value or a reference to a value.

Figure 3A:
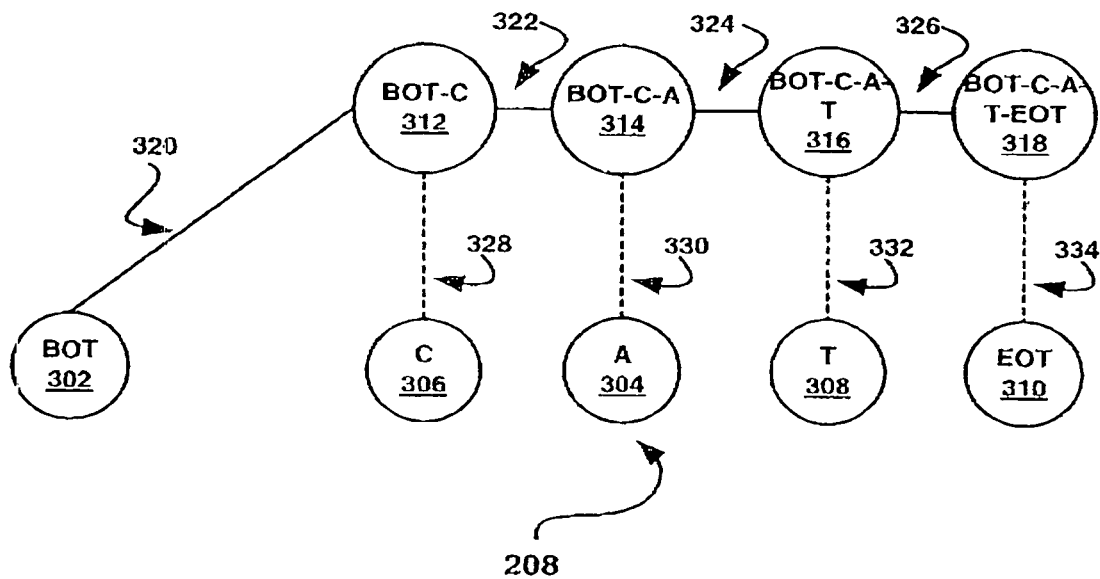
FIG. 3a illustrates a more detailed view of the exemplary interlocking trees datastore of FIG. 3a in accordance with one embodiment of the invention.

FIG. 3a is a more detailed view of the exemplary interlocking trees datastore 208. Some nodes, notably, root nodes 302 (BOT) and 310 (EOT) in the example, represent concepts such as begin indicator or end indicator, and root nodes 304 (A), 306 (C), 308 (T) represent dataset elements while other nodes, notably nodes 312 (BOT-C), 314 (BOT-C-A), 316 (ROT-C-A-T) and 318 (BOT-C-A-T-EOT) represent a sequential synthesis of a node representing a begin indicator and a node representing a dataset element into a node representing a subcomponent which is combined with a dataset element into another subcomponent and so on until a subcomponent is combined with a node representing an end indicator, creating a node representing an end product. In this case a sequential synthesis of a word from a series of letters followed by a delimiter (i.e., the series of letters "CAT" followed by the delimiter " " or the blank character) is captured. Delimiters in the input may act to distinguish end products. For example, it will be noted that the character or characters that delimit words may act to both indicate the end of one word and the beginning of another word. For example, in the string "CATS ARE" the blank character between "CATS" and "ARE" both signifies the end of the word "CATS" and the beginning of the word "ARE". Hence a delimiter such as the blank character in the input may be replaced by a begin indicator, such as "BOT", or by an end indicator, such as "EOT", in the node that is created, as described more fully below.

Nodes such as root nodes 304, 306, and 308 are referred to herein as elemental nodes because these nodes represent dataset elements and comprise indivisible units from which divisible units (subcomponents and end products) are composed. Nodes such as 312, 314, and 316 are referred to herein as subcomponents or subcomponent nodes because these nodes represent a combination of a concept indicator such as a begin indicator and a node representing a dataset element, or a combination of a subcomponent and a node representing a dataset element that does not comprise an end product or a combination of a subcomponent and a node representing an end indicator that does comprise an end product. Nodes such as node 318 represents an end product. In the example cited, dataset elements are letters, subcomponents represent combinations of letters that do not comprise words and end products are words. It will be noted that the set of root nodes includes "BOT", signifying, in the example, the beginning of a word and "EOT", signifying the end of a word. It will be appreciated that "BOT" and "EOT" represent begin and end indicators to which the invention is not limited. The use of other such indicators is contemplated, as is the absence of one or both such indicators. In one embodiment of the invention, an end product is distinguishable from a subcomponent because of a link from the node to a root node representing the EOT concept.

It will be appreciated that while in the example given, the universe of the input is the set of alphanumeric characters from which words can be derived, the contemplated invention is not so limited. For example, the universe of the input may be text, such as letters (from which words may be derived) or words (from which phrases or sentences may be derived), or may alternatively be amino acids from which a genome can be derived, limited resources used in a process, concepts, pixel sets, images, sounds, numbers, analog measurements or values or any other suitable universe which is composed of elemental units which can be digitized and sequentially combined to generate end products. Typically, in accordance with one embodiment of the invention, the elemental units are combined in an optimized sequence.

In addition to the above-described nodes, interlocking trees datastore 208 may also comprise a number of connections or links between nodes, such as links 320, 322, 324 and 326 and links 328, 330, 332 and 334. Links 320, 322, 324, and 326 and links 328, 330, 332 and 334 in one embodiment of the invention are bi-directional, that is, the pathway between root node (BOT) and node 318 (BOT-C-A-T-EOT) may be traversed via links 320, 322, 324 and 326, or alternatively, may be traversed via links 326, 324, 322 and 320. Links 320, 322, 324 and 326 (depicted by a solid line) are referred to herein as asCase links. Links 328, 330, 332 and 334 (depicted by an interrupted or dashed line) are referred to herein as asResult links. Similarly, in one embodiment of the invention, links 328, 330, 332 and 334 are bidirectional in that a pointer in node C 306 points to node BOT-C 312 and a pointer in node BOT-C 312 points to node C 306, a pointer in node A 304 points to node BOT-C-A 314 and a pointer in node BOT-C-A 314 points to node A 304, etc.

Figure 3B:
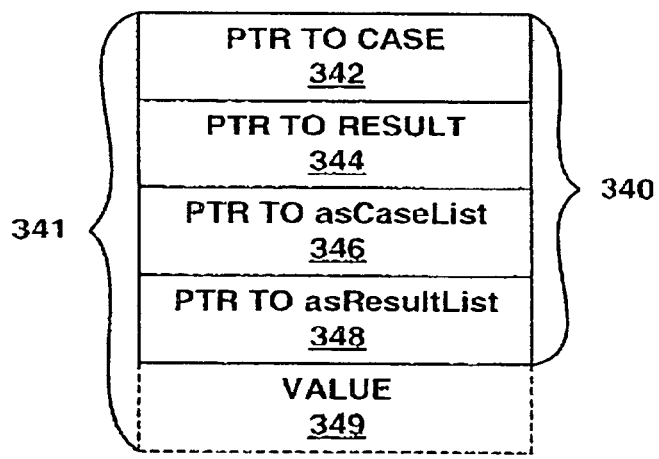
FIG. 3b illustrates a more detailed view of an exemplary node of the interlocking trees datastore of FIG. 3a in accordance with one embodiment of the invention.

FIG. 3b illustrates the information included in an exemplary node of interlocking trees datastore 208. Exemplary node 340 may represent a subcomponent or an end product. Exemplary node 340 may include a pointer to a first portion of the subcomponent or end product 340 (pointer to case 342, also referred to herein as "asCase"), a pointer to a second portion of the subcomponent or end product 340 (pointer to result 344, also referred to herein as "asResult"), a pointer to an asCaseList 346, a linked list of subcomponents or end products for which node 340 is a first portion and a pointer to an asResultList 348, a linked list of components or end products for which node 340 is a second portion.

Exemplary node 341 represents a root node. An exemplary node 341 includes a null pointer (pointer to case 342, also referred to herein as "asCase"), a second null pointer (pointer to result 344, also referred to herein as "asResult"), a pointer to an asCaseList 346, a linked list of subcomponents or end products for which root node 341 is a first portion and a pointer to an asResultList 348, a linked list of components or end products for which root node 341 is a second portion and value 349. Value 349 may contain the actual value, represent a condition or state, may contain a pointer or reference to a value or the like. Hence, in one embodiment of the invention, a root node representing a begin indicator concept or condition will have a null asResultList because a begin indicator will never be the second portion of a subcomponent, a root node representing a dataset element will have a null asCaseList because a dataset element will never be the first portion of a subcomponent, and a root node representing an end indicator concept or condition will have a null asCaseList because the end indicator will never be the first portion of a subcomponent. Finally, a root node comprised of an end product of a lower level will have a null asCaseList because the end product acts as a dataset element for the next level.

Figure 3C:
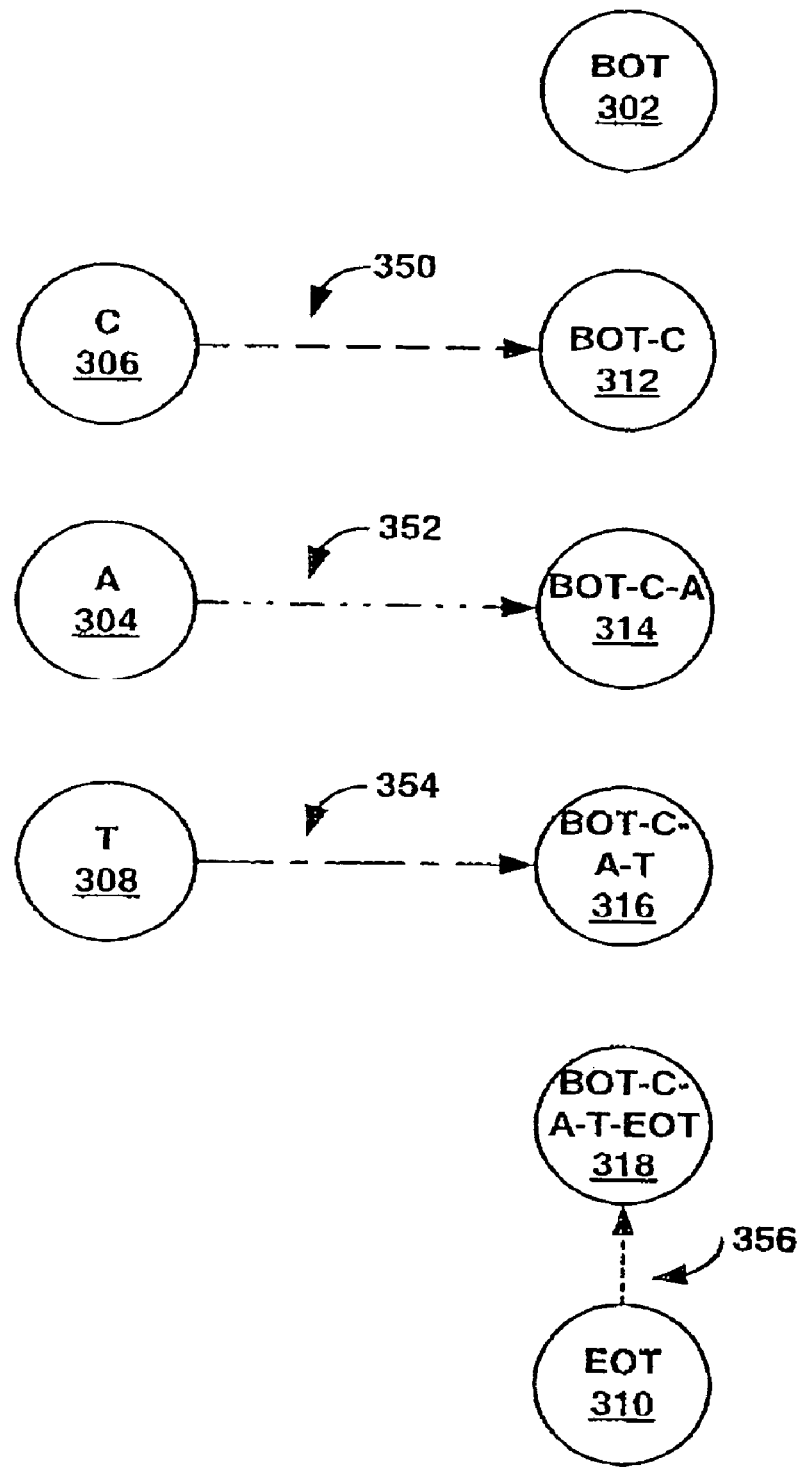
FIG. 3c illustrates the linked lists of interlocking trees datastore of FIG. 3a in accordance with one aspect of the invention.

FIG. 3c illustrates the asResult linked lists of interlocking trees datastore 208. Link 350 is established by setting a pointer in the asResultList of node C 306 to node BOT-C 302, link 352 by setting a pointer in the asResultList of node A 304 to node BOT-C-A 314, link 354 by setting a pointer in the asResultList of node T 308 to node BOT-C-A-T 318 and link 356 by setting a pointer in the asResultList of node EOT 310 to node BOT-C-A-T-EOT 318.

Figures 4, 5A:
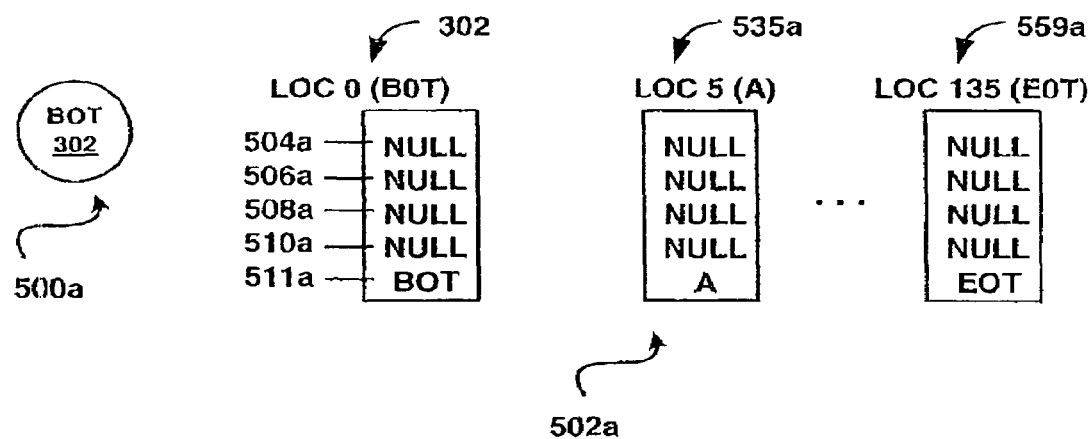
FIG. 4 illustrates an exemplary set of the data set elements of FIG. 2, as stored in memory in accordance with one embodiment of the invention.
FIGS. 5a-e depict the interlocking trees of FIG. 2 and the corresponding content of the nodes of the interlocking trees, as the interlocking trees are generated in accordance with one embodiment of the invention.
Figure 5B:
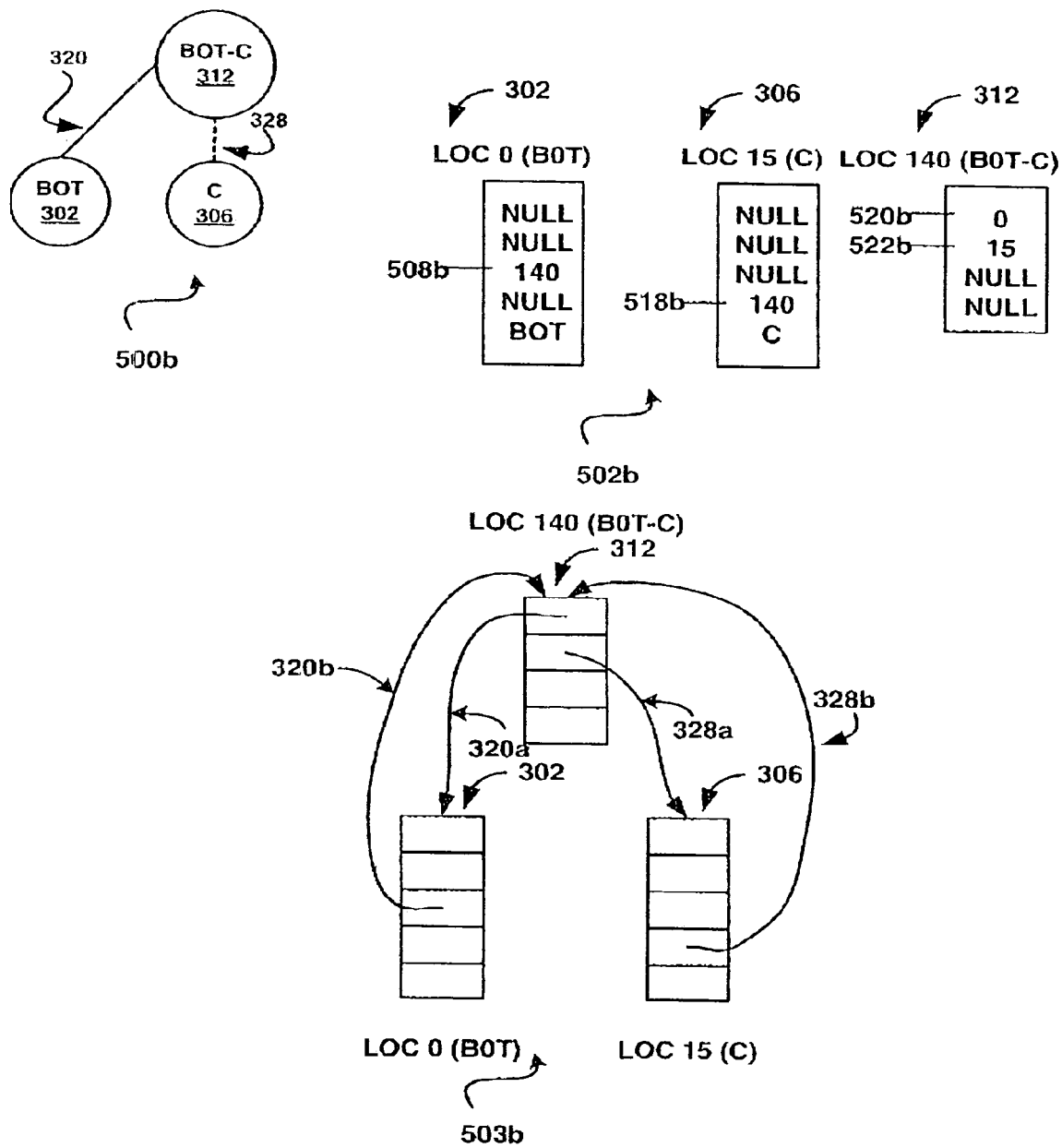
Figure 5C:
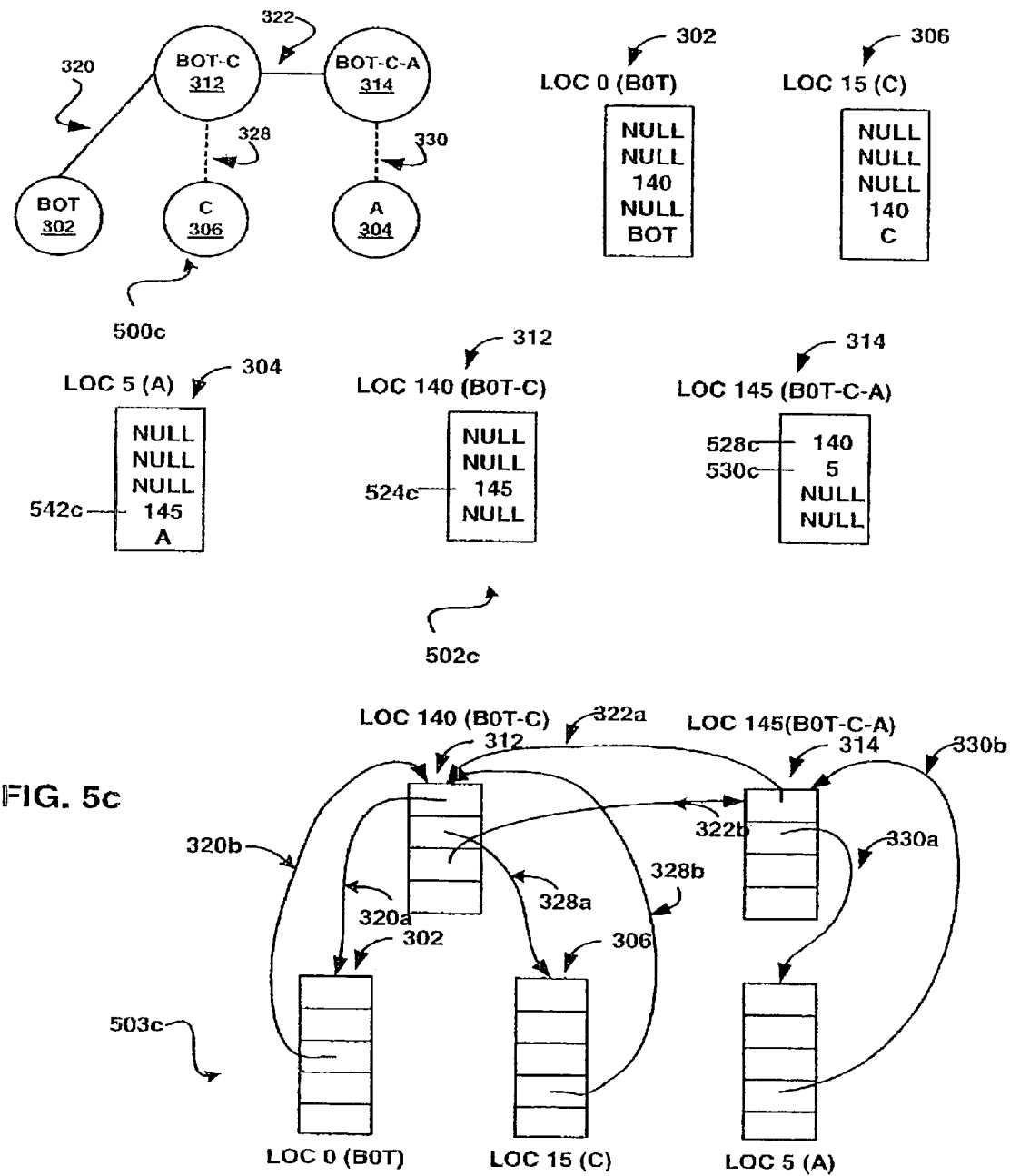
Figure 5D:
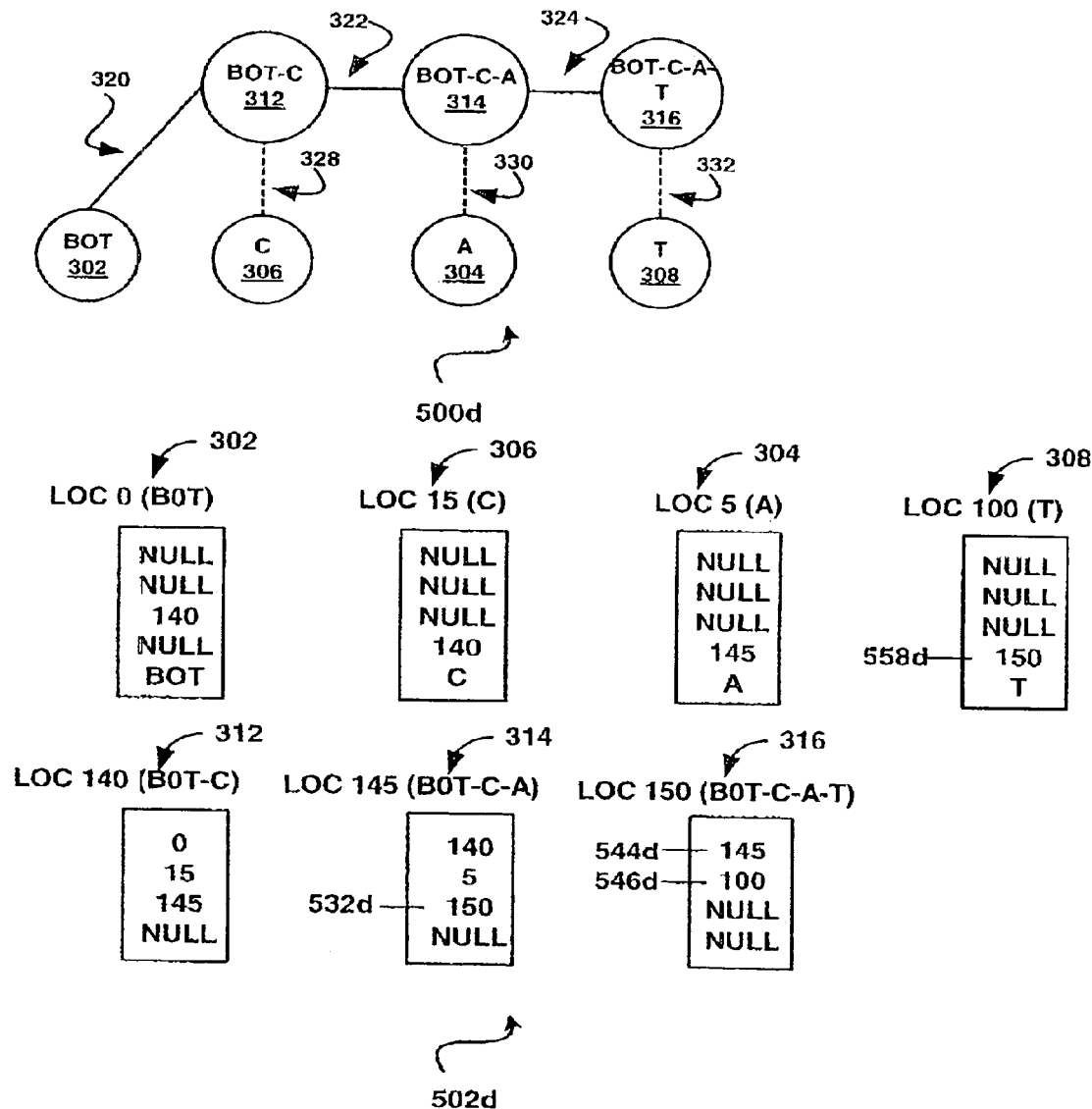
Figure 5E:
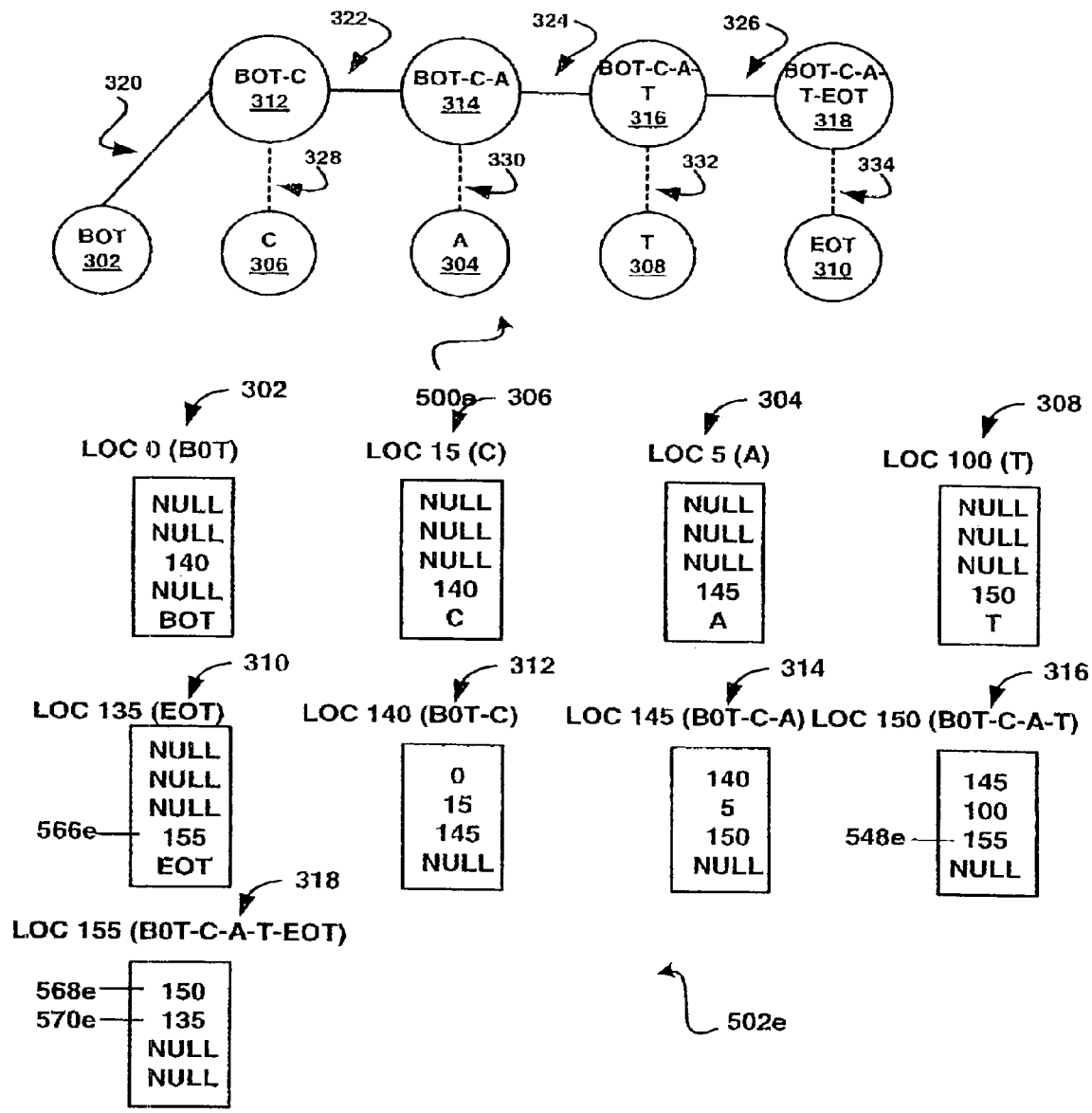
Figure 6:
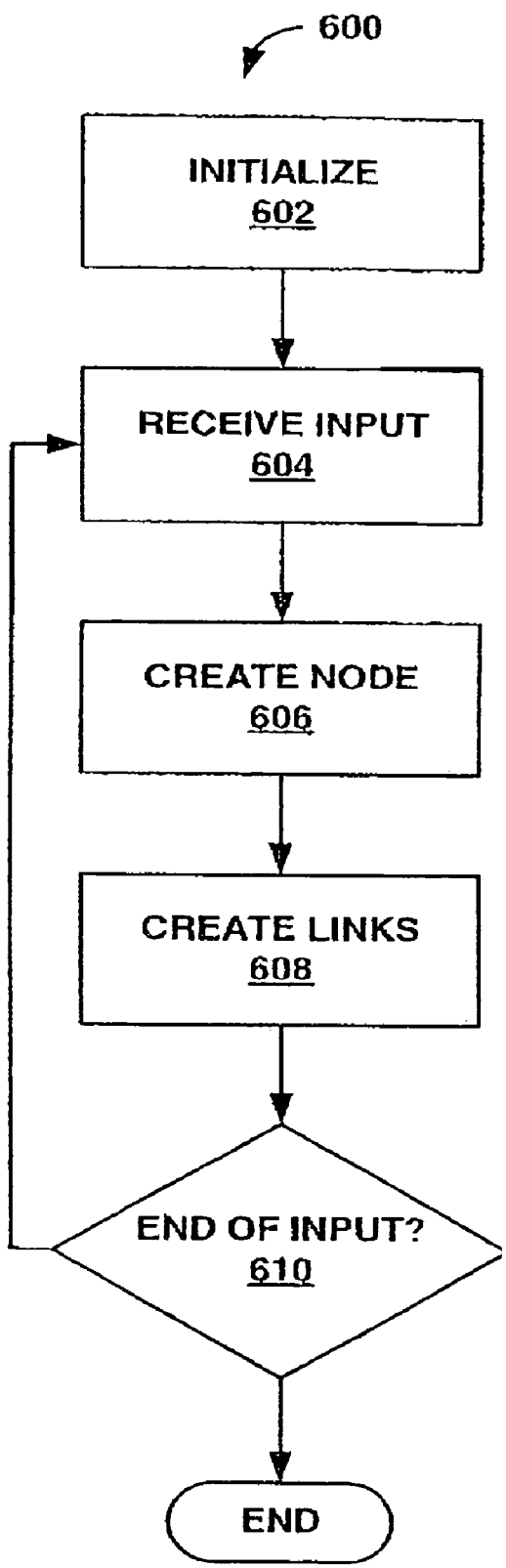
FIG. 6 is a flow diagram of an exemplary process of generating interlocking trees in accordance with one aspect of the invention.

FIG. 4 depicts an exemplary storage of exemplary dataset elements 206 BOT, A-Z and EOT in memory 104. As can be seen, in the example, BOT is stored at location 0, A at location 5, and so on to EOT at location 135. It will be understood that the placement of the dataset elements is exemplary only, and any suitable placement of dataset elements is contemplated. FIGS. 5a-e depict the interlocking trees datastore 208 and the corresponding content of the nodes of the interlocking trees datastore 208, as the interlocking trees datastore 208 is generated in an exemplary embodiment of the invention. FIG. 6 is a flow diagram of an exemplary process 600 for generating interlocking trees datastore 208 in accordance with one embodiment of the invention.

Referring now concurrently to FIGS. 4, 5 and 6, at step 602, the interlocking trees datastore is initialized. In one embodiment of the invention, initialization comprises setting a "current pointer" to a root node of an interlocking trees datastore that is to be created. In another embodiment of the invention, initialization comprises setting the "current pointer" to the root of an existing interlocking trees datastore.

In addition, the dataset elements may be loaded into memory and initialized. In one embodiment of the invention, root nodes, (e.g., root nodes BOT 302, A 535a ... EOT 559a of FIG. 5a), are initialized with the following values: case pointer=null, result pointer=null, pointer to asCaseList=null, asCaseList=null, pointer to asResultList=null, asResultList=null, and value to the dataset element or concept/condition indicator or representation therefor.

At this point, the interlocking trees datastore, such as, for example the interlocking trees datastore 500a in accordance with one embodiment of the invention, may comprise a single node 302 (BOT), signifying, in this case, the beginning of a word. Node 302 of block diagram 502a includes a pair of pointers (case pointer 504a and result pointer 506a initialized to null) and a pair of list pointers (a pointer to asCaseList and a pointer to asResultList initialized to null) and a value (value 511a initialized to some value, here described as BOT). For ease of understanding, in FIG. 5, block diagram 502a, the cell 508a and analogous cells in FIGS. 502b-e, and throughout the Figures, which in the interlocking trees datastore actually represent the pointer to the associated asCaseList, show instead the current contents of the associated asCaseList. Similarly the cell 510a and analogous cells in FIGS. 502b-e, which in the interlocking trees datastore actually represent the pointer to the associated asResultList, show instead the current contents of the associated asResultList.

AsCaseLists (e.g., asCaseList 508*a*) and asResultLists (e.g., asResultList 510*a*) may be implemented as linked lists. In another embodiment, the asCaseLists (e.g., asCaseList 508*a*) and asResultLists (e.g., asResultList 510*a*) are allocated as blocks of contiguous memory locations of configurable size, such as but not limited to arrays, the pointer to asCaseList is set to the beginning location of the asCaseList memory block and the pointer to the asResultList is set to the beginning location of the asResultList memory block.

At step 604, input is received. In one embodiment of the invention, the value of "current pointer" is set to "previous pointer" and "current pointer" is set to the input. In the example given, the input received is "C". At step 604, the input is validated. In the example given, this involves checking to see if "C" is a valid dataset element. "C" is indeed a valid element, located at location 15 in memory 104.

At step 606, if the node does not already exist, a node in the interlocking trees datastore is created, initialized and stored in some location in memory. In the example, node 312 in the interlocking trees datastore 208 is created, representing BOT-C, case pointer, result pointer, pointer to asCaseList, asCaseList, pointer to asResultList, and asResultList of node BOT-C 312, are initialized to null and BOT-C is stored in memory 104 at location 140.

At step 608, in accordance with one embodiment of the invention, links for the node created in step 606 are created. The new node is defined by setting the case pointer of the new node to the value of previous pointer and setting the result pointer of the new node to the value of the current pointer. FIG. 5*b* interlocking trees datastore 500*b* illustrates the interlocking trees datastore 208 after the creation of the links. Contents of nodes BOT 302, C 306 and BOT-C 312 after creation of the links are shown in block diagram 502*b*. Subcomponent BOT-C 312, is created by the sequential combination of node BOT 302 with node C 306. Therefore, the following values for case pointer and result pointer are set: case pointer 520*b* of node BOT-C 312 is set to 0, the location of node BOT 302 in memory 104, and result pointer 522*b* of node BOT-C 312 is set to 15, the location of the elemental node C 306 in memory 104.

In one embodiment of the invention, in addition to creating links from the new node to the nodes from which the new node is derived, asCaseList and asResultList links are created by adding a pointer to the location of the new node to the linked lists, asCaseList and asResultList, of the nodes from which the new node is derived. The pointers may be added to the end of the list, to the beginning of the list, or may be inserted somewhere within the list. Additionally, a number of lists may be maintained. For example, a node's asCaseList may include a sequential list wherein pointers are added to the end of the linked list in addition to an ordered list wherein pointers are maintained in an order of most frequently accessed. It will be understood that although the example given cites one ordered list and one sequential list, the invention is not so limited, any combination and number of lists is contemplated as within the scope of the invention. An ordered list may be ordered by last update, last access, or frequency of update or access, or by any other suitable ordering rule.

Links to the new node are made: a pointer to the new node is added to the asCaseList of previous pointer and to the asResultList of current pointer. In the example, bi-directional link 320 is generated by setting Case pointer 520*b* of node BOT-C 312 to the location of node BOT 302, location 0, (link 320*a* of block diagram 503*b*), and updating asCaseList 508*b* (link 320*b*) of node BOT 302 by adding a pointer to the location of node BOT-C 312, location 140, to asCaseList 508*b*. Case pointer 520*a* is set because node BOT 302 is one of the defining nodes of node BOT-C 312. AsCaseList 508*b* is updated because node BOT 302 is used in the synthesis of node BOT-C 312 being the first of the two nodes from which node BOT-C 312 is created. AsCaseList 508*b* presently contains the null set, (i.e., asCaseList 508*b* is empty). Because node BOT-C 312 is located at location 140 in memory 104, asCaseList 508*b* is updated from null to 140. Had asCaseList 508*b* comprised a non-null set, node BOT-C 312 location 140 would have been added to asCaseList 508*b* in one of the ways discussed above.

Similarly, bi-directional link 328 is generated by setting Result pointer 522*b* of node BOT-C 312 to the location of node C, location 15, (link 328*a* of block diagram 503*b*) and updating asResultList 518*b* (link 328*b*) of elemental node C 306 by adding a pointer to the location of node BOT-C 312 to asResultList 518*b*. Result pointer 522*b* is set because node C 306 is one of the defining nodes of node BOT-C 312. AsResultList 518*b* is updated because node C 306 comprises the second of the two nodes from which node BOT-C 312 is created, (hence link 328*b* is called an asResult link). AsResultList 518*b* presently contains the null set, (i.e., asResultList 518*b* is empty). Because node BOT-C 312 is located at location 140 in memory 104, asResultList 518*b* is updated from null to 140. Had asResultList 518*b* comprised a non-null set, node BOT-C 312 location 140 would have been added to asResultList 518*b* in one of the ways discussed above.

At this point, the datastore depicted in FIG. 5*b*, interlocking trees datastore 500*b* has been created. The same structure is represented in more detail in FIG. 5*b*, block diagram 503*b*. It will be noted that link 320*b* represents a pointer to the location of node BOT-C 312, and is the first element in the asCaseList 508*b* for node BOT 302, and that link 328*b* represents a pointer to the location of node BOT-C 312, and is the first element in the asResultList 518*b* of node C 306. Link 320*a* represents a pointer from node BOT-C 312 to its first portion, node BOT 302, and link 328*a* represents a pointer from node BOT-C 312 to its second portion, node C 306.

At step 610 it is determined whether or not there is more input. In this case, there is more input so processing returns to step 604. At step 604, input is received. In the example given, the input received is "A". At step 604, the input is validated. In the example given, this involves checking to see if "A" is a valid dataset elemental. "A" is indeed a valid elemental, located at location 5 in memory 104.

At step 606, if the node does not already exist, a node in the interlocking trees datastore is created, initialized and stored in some location in memory. In the example, node 314 in the interlocking trees datastore 208 is created, representing BOT-C-A, case pointer, result pointer, pointer to asCaseList, asCaseList, pointer to asResultList and asResultList of node BOT-C-A 314 are initialized to null and node BOT-C-A 314 is stored in memory 104 at location 145.

At step 608, in accordance with one embodiment of the invention, links for the node created in step 606 are created. FIG. 5*c* illustrates the interlocking trees datastore 500*c* following creation of the links. Content of nodes BOT 302, C 306, A 304, BOT-C 312 and BOT-C-A 314 are shown in block diagram 502*c*. Subcomponent BOT-C-A 314 is created by the sequential combination of node BOT-C 312 with node A 304. Therefore, the following values for case pointer and result pointer are set: case pointer 528*c* of node BOT-C-A 314 is set to 140 (link 322*a*), the location of the elemental node BOT-C 312 in memory 104 and result pointer 530*c* of node BOT-C-A 314 is set to 5 (link 330*a*), the location of the elemental node A 304 in memory 104.

Bi-directional link 322 is generated by setting Case pointer 528*c* to 140 (link 322*a*) and by adding a pointer to the location of node BOT-C-A 314 in memory 104 to asCaseList 524c of node BOT-C 312 (link 322b). AsCaseList 524c is updated because node BOT-C 312 comprises the first of the two nodes from which node BOT-C-A 314 is created. Before the creation of link 322b, asCaseList 524c of node BOT-C 312 contained the null set, (i.e., asCaseList 524c was empty). Because node BOT-C-A 314 is found at location 145 in memory 104, asCaseList 524c is updated from null to 145. Had asCaseList 524c comprised a non-null set, node BOT-C-A 314 location 145 would have been added to asCaseList 524c in one of the ways discussed above.

Similarly, bi-directional link 330 is generated by setting Result pointer 530c of node BOT-C-A 314 to 5 and by updating asResultList 542c of elemental node A 304 by adding a pointer to the location of node BOT-C-A 314 to asResultList 542c of node A 304. AsResultList 542c is updated because node A 304 comprises the second of the two nodes from which node BOT-C-A 314 is created. Before the creation of link 330b, asResultList 542c contained the null set, (i.e., asResultList 542c was empty). Because node BOT-C-A 314 is located at location 145 in memory 104, asResultList 542c is updated from null to 145. Had asResultList 542c comprised a non-null set, node BOT-C-A 314 location 145 would have been added to asResultList 542c in one of the ways discussed above.

At this point, the datastore depicted in FIG. 5c, interlocking trees datastore 500c has been created. The same structure is represented in more detail in FIG. 5c, block diagram 503c. It will be noted that link 322b represents a pointer to the location of node BOT-C-A 314, and location 145 is the first element in the asCaseList 524c for node BOT-C 312, and that link 330b represents a pointer to the location of node BOT-C-A 314, and 145 is the first element in the asResultList 542c for node A 304. Link 322a represents a pointer from node BOT-C-A 314 to its first portion, node BOT-C 312 and link 330a represents a pointer from node BOT-C-A 314 to its second portion, node A 304.

At step 610 it is determined whether or not there is more input. In this case, there is more input so processing returns to step 604. At step 604, input is received. In the example given, the input received is "T". At step 604, the input is validated. In the example given, this involves checking to see if "T" is a valid dataset element. "T" is indeed a valid dataset element, located at location 100 in memory 104.

At step 606, if the node does not already exist, a node in the interlocking trees datastore is created, initialized and stored in some location in memory. In the example, node 316 in the interlocking trees datastore 208 is created, representing node BOT-C-A-T 316, case pointer, result pointer, pointer to asCaseList, asCaseList, pointer to asResult List and asResult List are initialized to null and node BOT-C-A-T 316 is stored in memory 104 at location 150.

At step 608, links for the node created in step 606 are created. FIG. 5d illustrates the interlocking trees datastore 500d following creation of the links. Content of nodes BOT 302, C 306, A 304, T 308, BOT-C 312, BOT-C-A 314 and BOT-C-A-T 316 are shown in block diagram 502d. Subcomponent BOT-C-A-T 316 is created by the sequential combination of node BOT-C-A 314 with node T 308. Therefore, the following values for case pointer and result pointer are set for node BOT-C-A-T 316: case pointer 544d is set to 145, the location of the node BOT-C-A 314 in memory 104 and result pointer 546d is set to 100, the location of the elemental node T 308 in memory 104.

Bi-directional link 324 is generated by setting case pointer 544d to 145 and adding a pointer to the location of node BOT-C-A 314 (location 150) in memory 104 to asCaseList 532d of node BOT-C-A 314. AsCaseList 532d is updated because node BOT-C-A 314 comprises the first of the two nodes from which node BOT-C-A-T 316 is created. Before the creation of link 324, asCaseList 532d of node BOT-C-A 314 contained the null set. Because BOT-C-A-T is found at location 150 in memory 104, asCaseList 532d is updated from null to 150. Had asCaseList 532d of node BOT-C-A 314 contained data, 150 would have been added to the list, in one of the ways outlined above.

Similarly, bi-directional link 332 is generated by setting result pointer 546d to 100 and updating asResultList 558d of elemental node T 308 by adding a pointer to the location of node BOT-C-A-T 316 to asResultList 558d. AsResult List 558d is updated because node T 308 comprises the second of the two nodes from which node BOT-C-A-T 316 is created. Before the creation of link 332, asResultList 558d of elemental node T 308 contained the null set, so the null set is replaced with 150, the location of node BOT-C-A-T 316 in memory 104. Had asResultList 558d contained data, 150 would have been added to the list in one of the ways outlined above.

At this point, the datastore depicted in FIG. 5d, interlocking trees datastore 500d has been created. One of skill in the art will appreciate that a more detailed representation of interlocking trees datastore 500d, analogous to that depicted in FIG. 5c, block diagram 503c for interlocking trees datastore 500c could be shown.

At step 610 it is determined whether or not there is more input. In this case, there is more input so processing returns to step 604. At step 604, input is received. In the example given, the input received is " " or the blank character. At step 604, the input is validated. In the example given, this involves checking to see if the blank character is a valid dataset elemental. The blank character is indeed a valid elemental, and is a delimiter signifying, in this case, the end of the word "CAT". Thus, in one embodiment of the invention, node EOT 310 located at location 135 is added to the subcomponent BOT-C-A-T 316 to create an end product or monad, which in this case is a word.

At step 606, if the node does not already exist, a node in the interlocking trees datastore is created, initialized and stored in some location in memory. In the example, node 318 in the interlocking trees datastore 208 is created, representing node BOT-C-A-T-EOT 318, case pointer, result pointer, pointer to asCaseList, asCaseList, pointer to asResultList and asResultList of node BOT-C-A-T-EOT 318 are initialized to null and node BOT-C-A-T-EOT 318 is stored, for example, in memory 104 at location 155.

At step 608, links for the node created in step 606 are created. FIG. 5e illustrates the interlocking trees datastore 500e following creation of the links. Content of nodes BOT 302, C 306, A 304, T 308, EOT 310, BOT-C 312, BOT-C-A 314, BOT-C-A-T 316 and BOT-C-A-T-EOT 318 after creation of the links are shown in block diagram 502e. End product 318 (BOT-C-A-T-EOT) is created by the sequential combination of node BOT-C-A-T 316 with node EOT 310. Therefore, the following values for case pointer and result pointer for node BOT-C-A-T-EOT 318 are set: case pointer 568e of end product BOT-C-A-T-EOT 318 is set to 150, the location of the node BOT-C-A-T 316 in memory 104 and result pointer 570e of end product BOT-C-A-T-EOT 318 is set to 135, the location of the elemental node EOT 135 in memory 104.

Bi-directional link 326 is generated by setting Case pointer 568e of end product BOT-C-A-T-EOT 318 to 150 and adding a pointer to the location of node BOT-C-A-T 316 in memory 104 to asCaseList 548e of node BOT-C-A-T 316. AsCaseList 548e is updated because node BOT-C-A 314 comprises the first of the two nodes from which node BOT-C-A-T 316 is created. Before creation of link 334, asCaseList 548*e* of node BOT-C-A-T 316 contained the null set, (i.e., asCaseList 548*e* was empty). Because node BOT-C-A-T 316 is found at location 155 in memory 104, asCaseList 548*e* of node BOT-C-A-T 316 is updated from null to 155. Had asCaseList 548*e* comprised a null-null set, node BOT-C-A-T location 155 would have been added to asCaseList 548*e* in one of the ways discussed above.

Similarly, bidirectional link 334 is generated by setting Result pointer 570*e* of end product BOT-C-A-T-EOT 318 to 135 and updating asResultList 566*e* of node EOT 310 by adding a pointer to the location of node BOT-C-A-T-EOT 318 to asResult List 566*e* of node EOT 310. AsResultList 566*e* is updated because node EOT 310 comprises the second of the two nodes from which node BOT-C-A-T-EOT 318 is created, (hence link 334 is called an asResult link). Before creation of link 334, asResultList 566*e* contained the null set, (i.e., asResultList 566*e* was empty). Because node BOT-C-A-T-EOT 318 is located at location 155 in memory 104, asResultList 566*e* is updated from null to 155. Had asResultList 566*e* comprised a non-null set, node BOT-C-A-T-EOT 318 location 155 would have been added to asResultList 566*e* in one of the way discussed above.

At this point, the datastore depicted in FIG. 5*e*, interlocking trees datastore 500*e* has been created. One of skill in the art will appreciate that a more detailed representation of interlocking trees datastore 500*e*, analogous to that depicted in FIG. 5*c*, block diagram 503*c* for interlocking trees datastore 500*c* could be shown.

At step 610 it is determined whether or not there is more input. In this case, there is no more input so processing ends at step 612.

Now consider that input 204 contains "CAT TAB" instead of "CAT ". The above process is followed. Upon processing of the input up to "CAT ", the interlocking trees datastore 500*e* of FIG. 5*e* is created. At step 610 there is more input, however, so the process continues, eventually resulting in the interlocking trees datastore 700*a* of FIG. 7*a*. The content of corresponding nodes BOT 302, C 306, A 304, T 308, B 718, EOT 310, BOT-C 312, BOT-C-A 314, BOT-C-A-T- 316, BOT-C-A-T-EOT 318, BOT-T 703, BOT-T-A 705, BOT-T-A-B 707 and BOT-T-A-B-EOT 709 is illustrated in block diagram 702*a*. It will be noted that nodes BOT-T 703, BOT-T-A 705, BOT-T-A-B 707 and BOT-T-A-B-EOT 709 have been added to interlocking trees datastore 500*e* to create interlocking trees datastore 700*a*.

In this process, the asCase links 701, 704, 706 and 708 were created and the asResult links 710, 712, 714 and 716 were created. AsCase pointer 720*f* of node BOT-T 703 is set to 0, the location of node BOT 302. AsResult pointer 722*f* of node BOT-T 703 is set to 100, the location of node T 308. AsCase pointer 728*f* of node BOT-T-A 705 is set to 170, the location of node BOT-T 703. AsResult pointer 730*f* of node BOT-T-A 705 is set to 5 the location of node A 304 and so on.

AsCase link 701 is created by adding 170, the location of BOT-T 703 to asCaseList 508*f* of node BOT 302, so that asCaseList 508*f* includes both 140, the location of BOT-C 312 and 170, the location of BOT-T 703. AsCase link 704 is created by adding 175, the location of BOT-T-A to asCaseList 724*f* of node BOT-T 703. AsCase link 706 is created by adding 180, the location of BOT-T-A-B to asCaseList 732*f* of node BOT-T-A 705 and so on.

AsResult link 710 is created by adding 170, the location of BOT-T 703 to asResultList 558*f* of node T 308, so that asResultList 558*f* includes both 150, the location of node BOT-C-A-T and 170, the location of BOT-T 703. AsResult link 712 is created by adding 175, the location of BOT-T-A to asResultList 542*f* of node A 304, so that asResultList 542*f* includes both 145, the location of node BOT-C-A 314 and 175, the location of BOT-T-A. AsResult link 714 is created by adding 180, the location of node BOT-T-A-B 707 to asResultList 742*f* of node B 718. Because asResultList 742*f* of node B 718 was formerly null, asResultList 742*f* of node B 718 contains only 180, the location of node BOT-T-A-B 707. AsResult link 716 is created by adding 185, the location of BOT-T-A-B-EOT 709 to asResultList 566*f* of node EOT 310, so that asResultList 566*f* includes both 155, the location of node BOT-C-A-T-EOT 318 and 185, the location of BOT-T-A-B-EOT 185.

Figure 8:
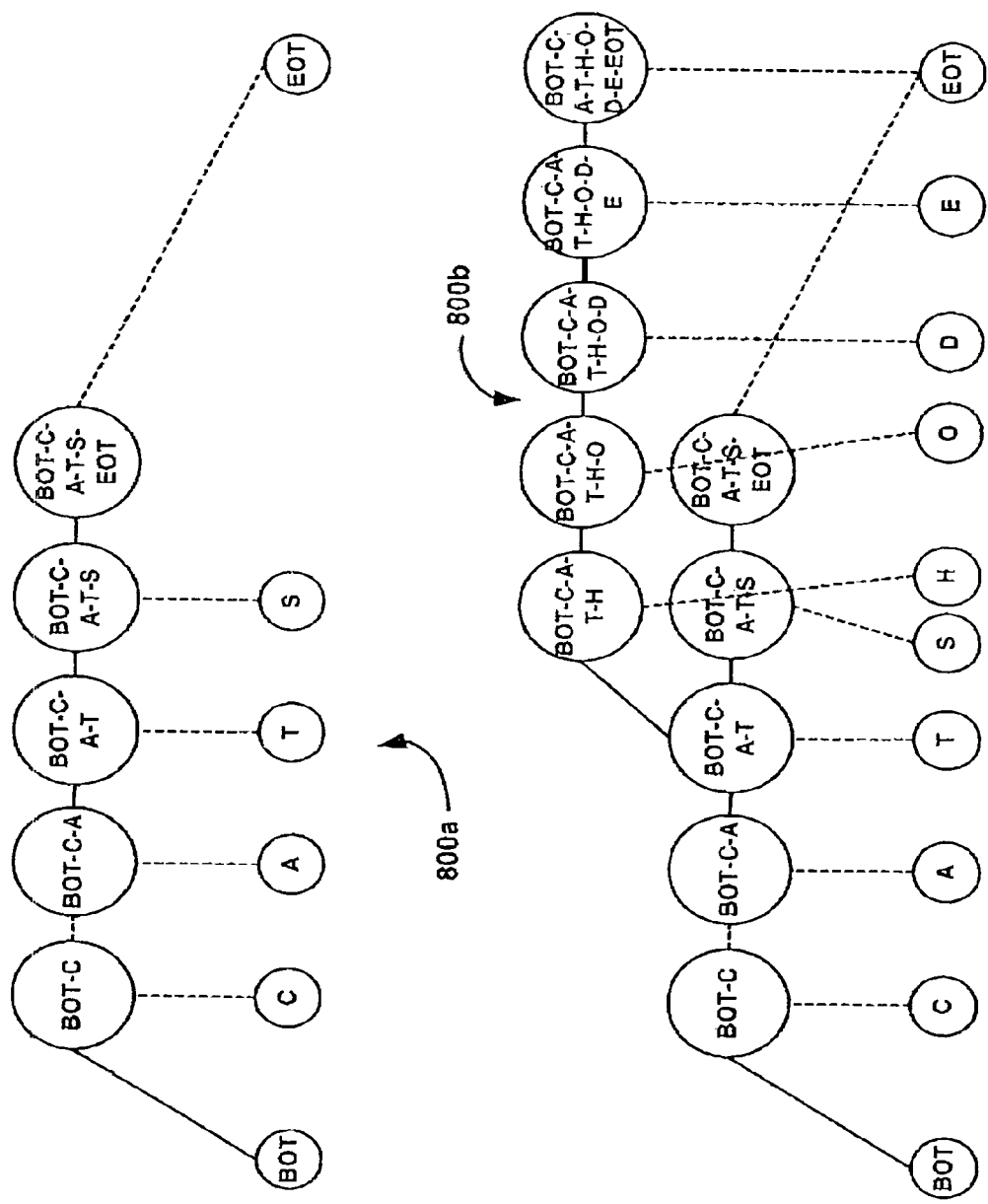
FIG. 8 illustrates other interlocking trees datastores in accordance with embodiments of the invention.

Now consider that input 204 contains "CATS CATHODE" instead of "CAT". The above process is followed. Upon processing of the input "CAT", the interlocking trees datastore of FIG. 5*d* is created. At step 610, more input is found so the process continues. Following the processing of the input "CATS", the interlocking trees datastore 800*a* of FIG. 8 has been generated. More input is found. As "CATHODE" is processed, new nodes for BOT-C, BOT-C-A, and BOT-C-A are not created because they already exist. The additional input "S CATHODE" is processed, resulting in the interlocking trees datastore 800*b* of FIG. 8. It will be apparent to one of skill in the art that the resulting tree is self-organizing, so that the structure of the interlocking trees datastore that results is dictated by and dependent upon the input received.

Figure 9A:
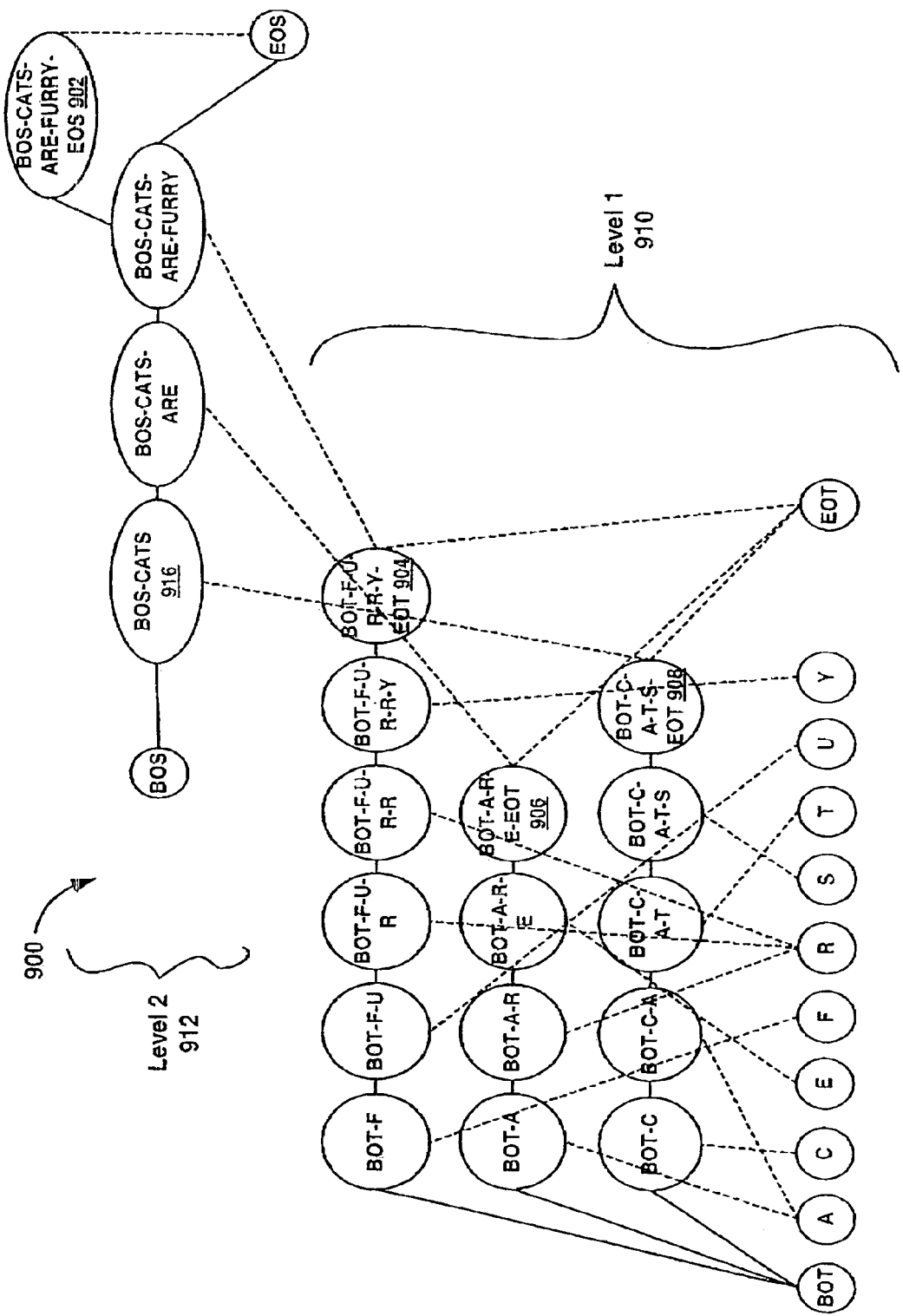
FIG. 9a illustrates another interlocking trees datastore in accordance with one embodiment of the invention.

Now consider that input 204 contains "CATS ARE FURRY." instead of "CAT". FIG. 9*a* illustrates an interlocking trees datastore 900 generated in one embodiment of the invention. The presence of an indicator in the input such as, in the present example, an end of phrase or end of sentence indicator, (e.g., the period after "FURRY"), may trigger the combination of end products of one level (BOT-C-A-T-EOT 908, BOT-A-R-E-EOT 906, BOT-F-U-R-R-Y-EOT 904) into subcomponents of the next level, that is the end product nodes (e.g., words such as "CATS", "ARE" and "FURRY") of one level (e.g., level 1 910) may become the root nodes representing dataset elements of the next level (e.g., level 2 912). Hence, node "BOT-CATS-ARE-FURRY-EOT" 902 is a single node representing the sentence "CATS ARE FURRY."

Figure 9B:
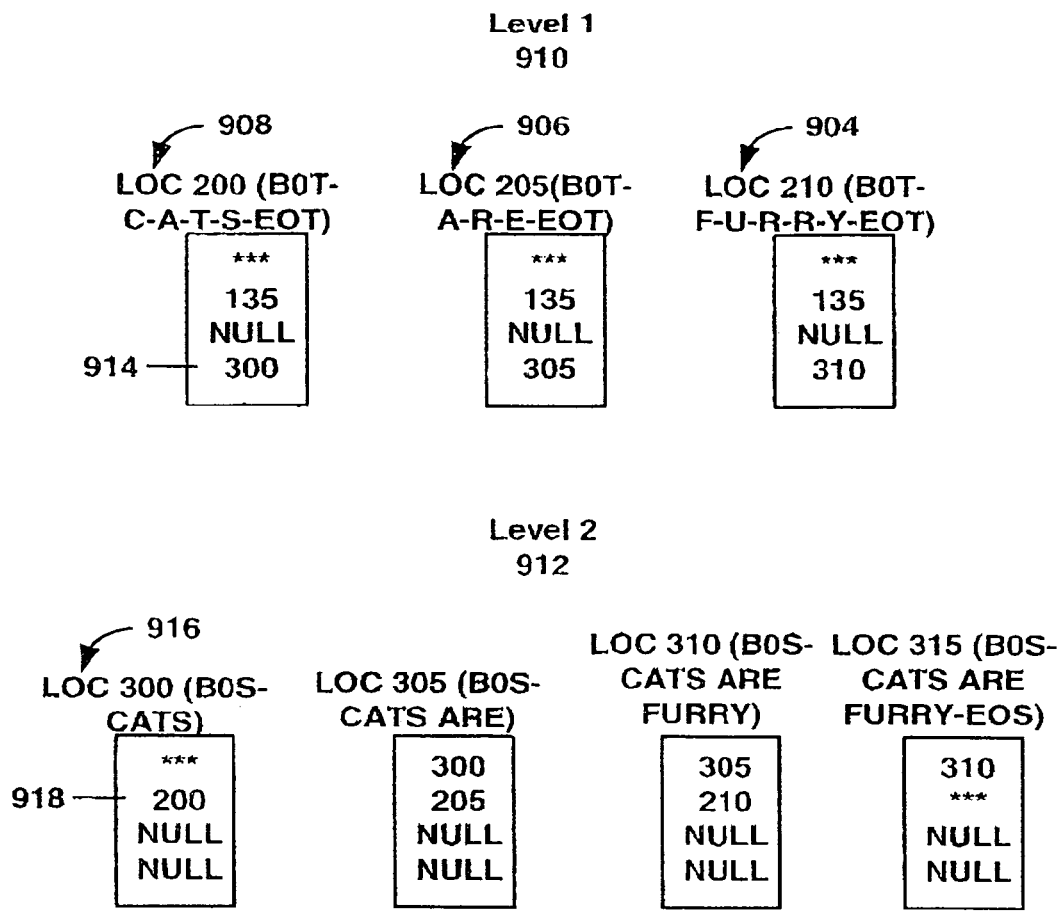
FIG. 9b illustrates exemplary content of nodes of the interlocking trees datastore of FIG. 9a in accordance with one embodiment of the invention.

In one embodiment of the invention, nodes representing the dataset elements of the higher level do not contain data or representations of data or concepts; that is elemental root nodes representing dataset elements of a higher level contain only pointers to nodes in a lower level. For example, FIG. 9*b* shows the content of some of the nodes of FIG. 9*a*. It will be noted that node BOT-C-A-T-S-EOT of level 1 910 is being used as an elemental root node of level 2 912 (asResultList 914 of node 908 contains 300, the location of node BOS-CATS 916 while the asResult pointer 918 of node BOS-CATS 916 contains 200, the location of node BOT-C-A-T-S-EOT 908) and so on.

Any suitable number of levels may be generated. For example, in the world of text, levels may represent letters, words, sentences, paragraphs, chapters, books, libraries and so on. It will be understood that although in the exemplary figure, two levels of the interlocking trees datastore (level 1 910 and level 2 912), the invention is not so limited. Any number of levels of the interlocking trees datastore can be constructed. Because the universe of this example is text, that is, combinations of letters form words (one level of end products), the result of the combination of words in this embodiment of the invention is a phrase or sentence (another level of end products). Sentences may be combined to form paragraphs, paragraphs may be combined to form chapters or sections and so on.

It will be further understood that depending on the input universe, end products may represent entities other than words, phrases, sentences and so on. To offer one example of many: if the input is a sequence of amino acids comprising a chromosome, one end product may represent a gene or an allele.

Figure 10:
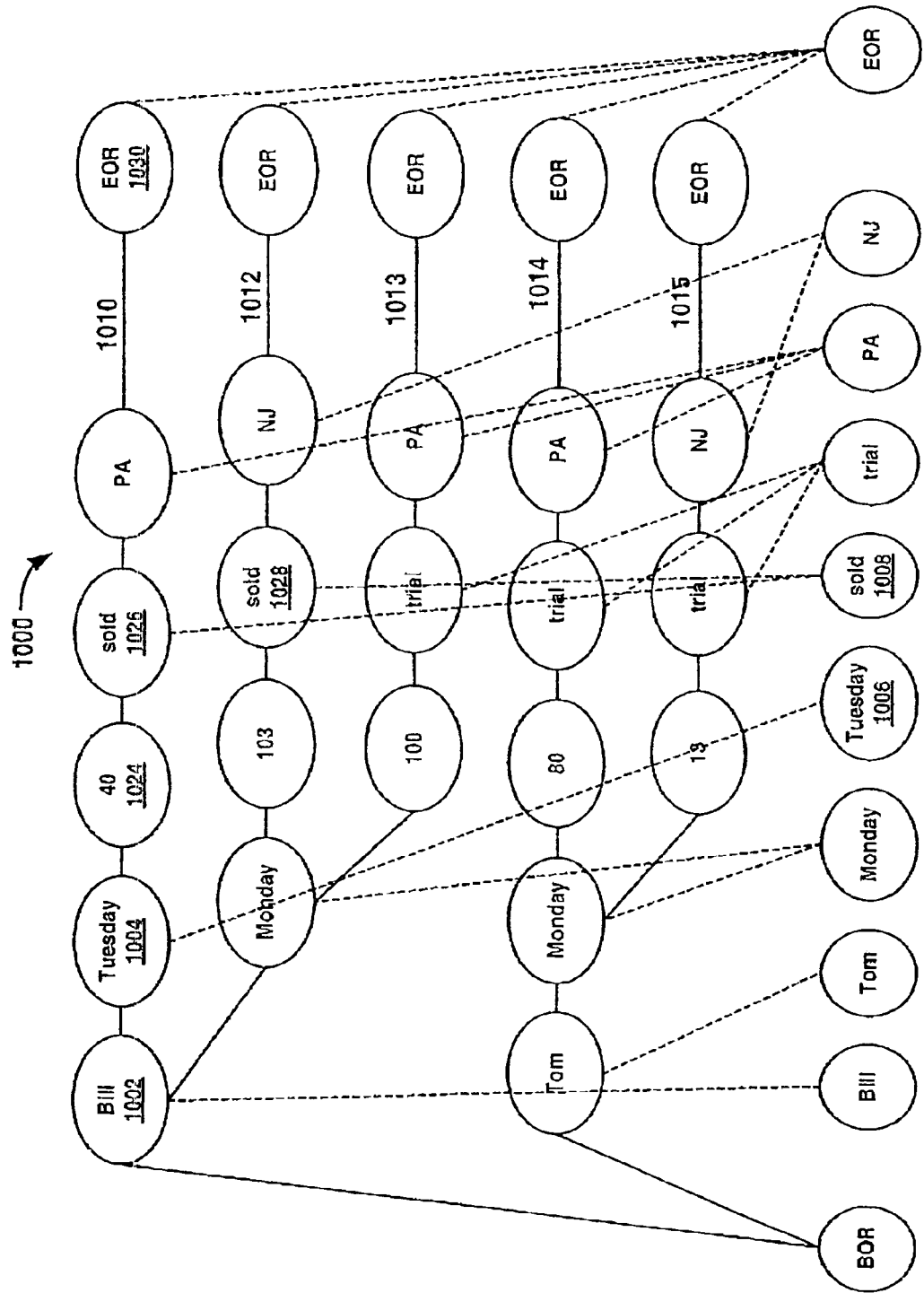
FIG. 10 illustrates another interlocking trees datastore in accordance with one embodiment of the invention.

Now consider that input 204 comprises data records such as the following:

Bill Tuesday 40 sold PA
Bill Monday 103 sold NJ
Bill Monday 100 trial PA
Tom Monday 80 sold PA
Tom Monday 13 trial NJ In one embodiment of the invention, the dataset elements are comprised of fields of information separated by a delimiter such as but not limited to the blank character. In one embodiment, the dataset elements are derived from the input, although it will be understood that the invention is not so limited, as described above. Dataset elements encountered thus far in the input data are salesman name, (Bill and Tom), days of the week (Monday, Tuesday), number of items (40, 103, 100, 80, 13), status (sold, trial) and state (PA, NJ). In one embodiment of the invention, the interlocking trees datastore 1000 of FIG. 10 will result from this input. In FIG. 10, for space reasons, the first portion of the node is not shown. For example, although node 1002 is labeled "Bill", node 1002 actually represents "BOT-Bill". Although node 1002 is labeled "Tuesday", node 1004 actually represents "BOT-Bill-Tuesday" and so on.

Accessing Information from the Interlocking Trees Datastore

Figure 11:
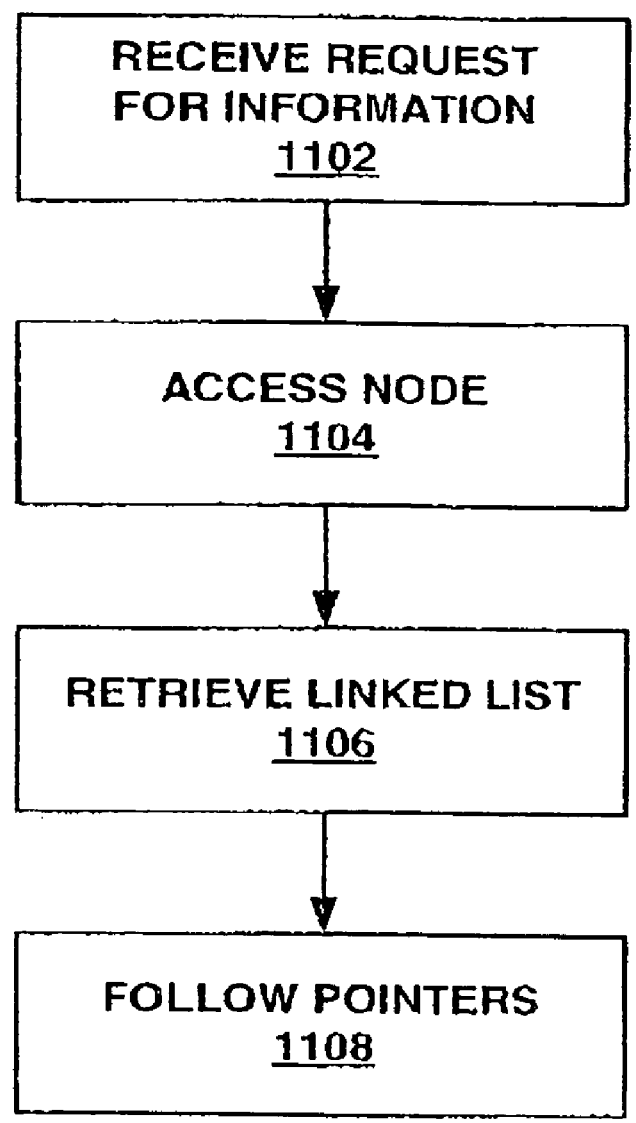
FIG. 11 is a flow diagram of an exemplary process of accessing data from an interlocking trees datastore in accordance with one embodiment of the invention.

A method for accessing information stored in the interlocking trees datastore is illustrated in FIG. 11. At step 1102, a request for information to be retrieved from the interlocking trees datastore is received. The request for information to be retrieved may be converted into a form that can be processed by the interlocking trees accessor. At step 1104, the indicated node is accessed. At step 1106 the appropriate asCaseList and/or asResultList is retrieved. At step 1108, the pointers in the appropriate asCaseList or asResultList are followed to retrieve the information desired. At step 1110, the requested information is collected and returned.

For example, referring again to FIG. 7a, datastore 700a including asResult links 328, 330, 332, 334, 710, 712, 714 and 716 call be used to determine the answers to questions of context such as: "What nodes include the letter 'A'?", "What letters does 'A' precede/follow?", "What (or how many) words include the letter 'A'?". "What words contain both the letters 'A' and 'T'?" "What words contain an 'A' preceded by a 'T'?" and innumerable other questions. (It will be understood that although for ease of understanding a particular letter or letters was specified in the example questions, any dataset element or group of units may be substituted therefor.)

For example, in one embodiment of the invention, nodes and end products containing a desired dataset element can be determined by following the pointers contained in the asResultList of the particular node representing the dataset element. The asResultList is accessed and each pointer in the list is followed to the asCase branch associated with that node. If end products are desired, the asCase branch tree is followed to the leaf node of the branch.

In one embodiment of the invention, a request for information is in the form of specifying constraints and/or a focus. For example, a request for information may be in the form of a list of constraints. The list of constrains may be nested or independent. In one embodiment of the invention, the asResultList of each listed constraint is found, branches for each node within each asResultList for each constraint are found, the branches are followed to their end products and the intersection of the end products for each branch within each asResultList for each constraint is selected. Nested constraints are found by first constraining the datastore to retrieve a set of data which is then used as the set of data to be further constrained and so on.

In one embodiment of the invention, the focus determines the information that is returned. In the case of a two-level datastore in which the dataset elements are letters, level one end products comprising words and level two end products comprising sentences, and the specified constraints are specific letters, specifying the focus to be "words" will result in the return of only words, specifying the focus to be "sentences" will result in the return of only sentences. Retrieval of end products from the first level would result in the return of words. Retrieval of end products from the second level would result in the return of sentences. In one embodiment, to retrieve sentences, the asResultList of each word is followed up to the next level and the specified branch is followed to its end product to retrieve the sentence including the specified letters.

In one embodiment, by following the tree having the level begin indicator as its root, all end products beginning with a constraint can be found, (e.g., all the words beginning with a specified letter can be found. Similarly, all end products with a specified constraint, or a specified constraint in a specified position, (e.g., all the words that have a specific letter in them or all words having a specified letter in a specified column) can be found. Similarly, by following the tree having the level end indicator as root, all end products that end in a specified constraint can be found (e.g., all words ending in a specified letter.) A plurality of constraints and/or foci may be specified.

For example, suppose the first node of an asCase branch of a tree containing a dataset element such as a letter (e.g., the letter "B") is desired. In one embodiment, the elemental root node representing the data element (e.g., node B 718) is retrieved from memory and its asResultList (e.g., asResultList 742f) is accessed to return the location of nodes that were created through the combination of some subcomponent with the elemental root node (e.g., node B 718). The nodes in the asResultList are accessed. In the example, location 180 is accessed, which holds node BOT-T-A-B 707. Thus node BOT-T-A-B 707 is a node in interlocking trees datastore 700a that includes a representation of the letter "B". To find the end product formed, the asCase branch (e.g., in this example, the branch containing node BOT-T 703, node BOT-T-A 705, node BOT-T-A-B 707 and node BOT-T-A-B-EOT 709), is followed by iteratively retrieving the asCaseList of the accessed node until the asCaseList retrieved is null. For example, to determine that the word containing dataset element B 718 is "TAB", asCaseList 740f of node BOT-T-A-B 707 is accessed to retrieve the location 185. The contents of location 185 are accessed to retrieve asCaseList 748f. Because asCaseList 748f is the null pointer, the end product has been reached.

Figure 7A:
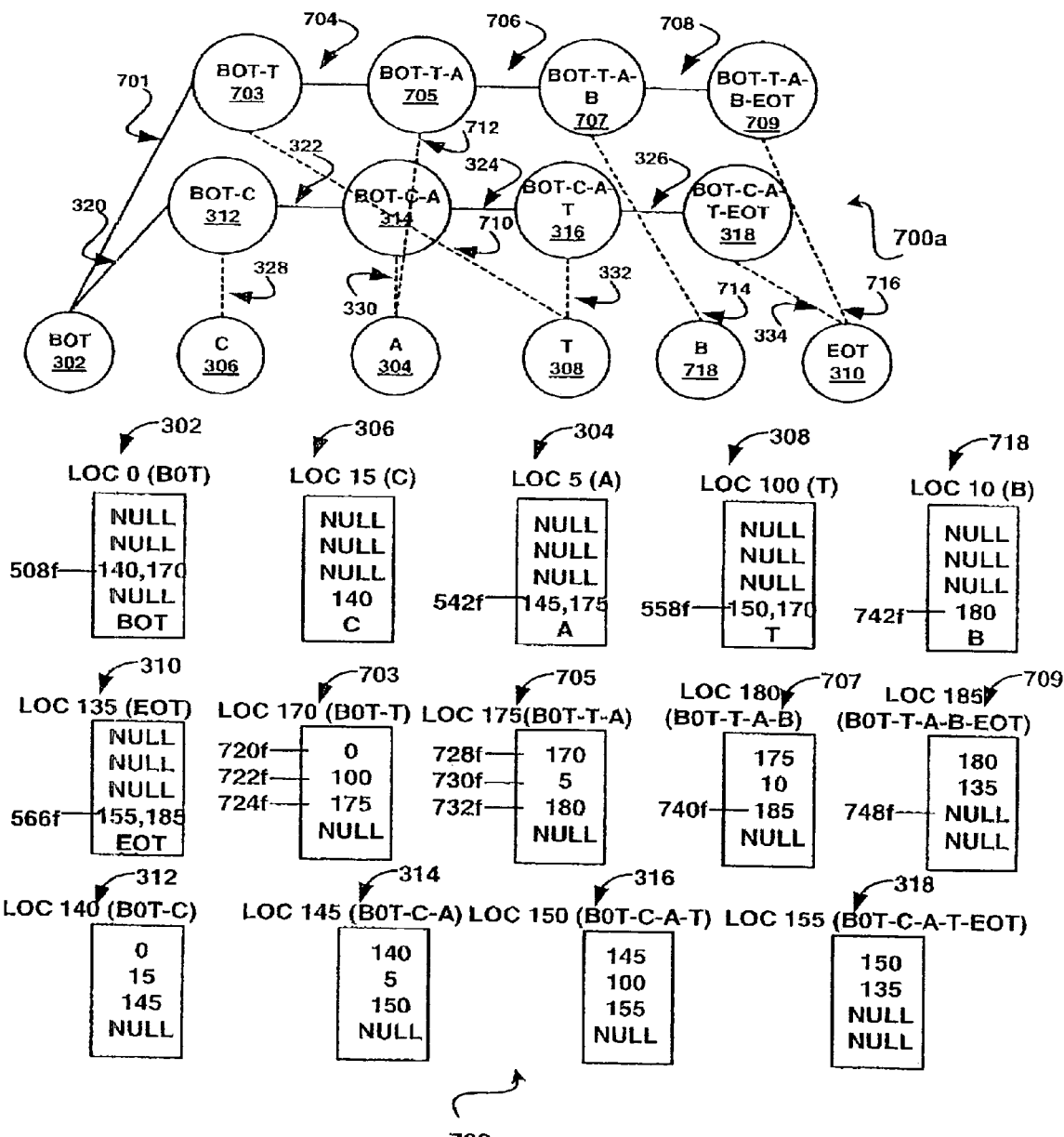
FIG. 7a illustrates another interlocking trees datastore and corresponding nodes in accordance with one embodiment of the invention.
Figure 7B:
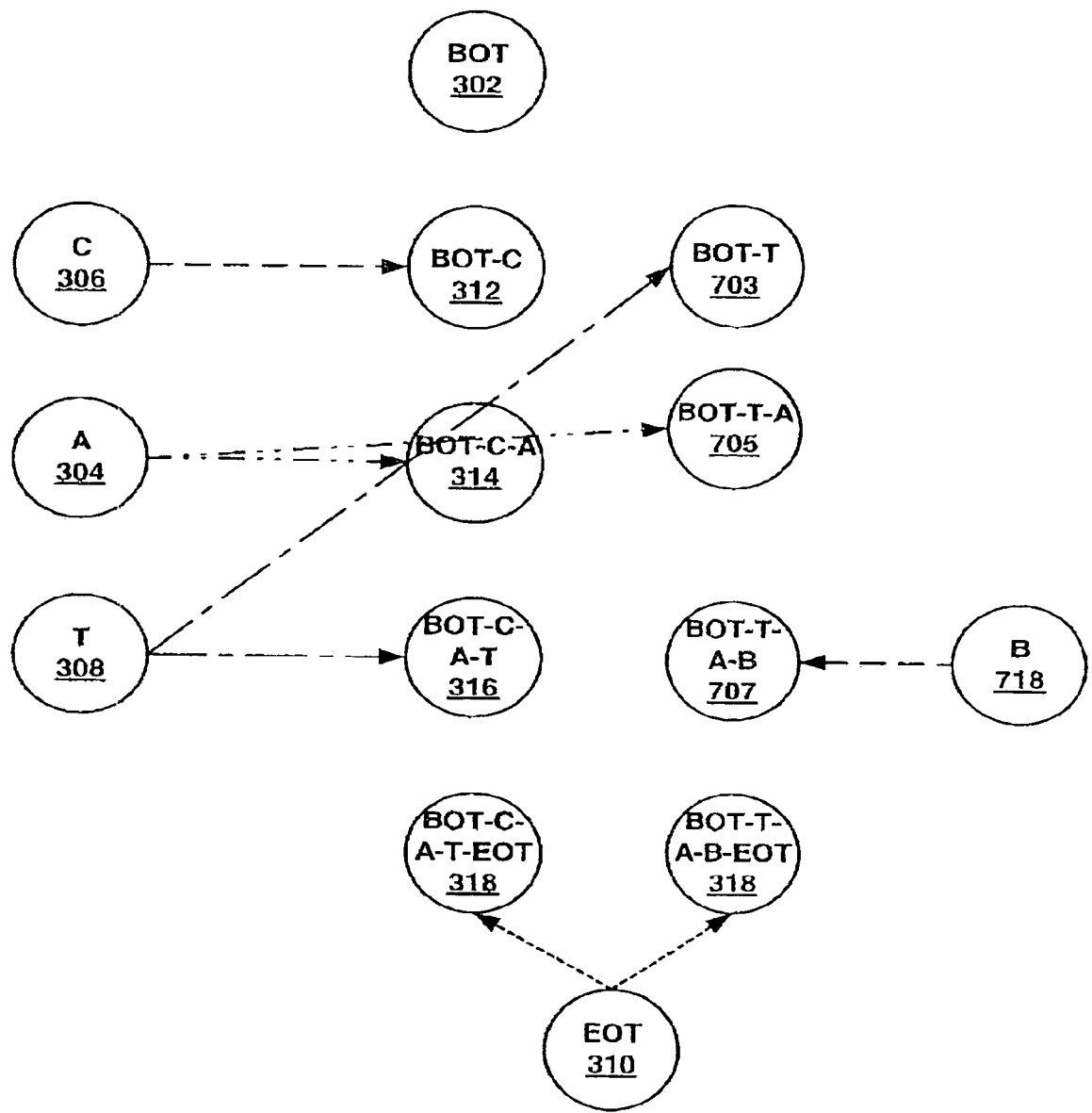
FIG. 7b illustrates the linked lists of interlocking trees datastore of FIG. 7a in accordance with one aspect of the invention

Still referring to FIG. 7a, now suppose the first nodes of all asCase branches containing the letter "A" are desired. Elemental root node A 304 is retrieved from memory and its asResultList 542f is accessed to return the locations 145 and 175. First location 145 is accessed, which contains node BOT-C-A 314. Node BOT-C-A 314 is the first node in the first branch of data structure 700a that includes the letter "A". To find the end product formed, the asCase branch (e.g., in this example, the branch containing node BOT-C 312, node BOT-C-A 314, node BOT-C-A-T 316 and node BOT-C-A-T-EOT 318), the asCase links of the branch are followed by iteratively retrieving the asCaseList of the node until the asCaseList retrieved is null. For example, to determine that the first word containing dataset element A 304 is "CAT", asCaseList 740f of node BOT-C-A 314 is accessed to retrieve the location 145. The contents of location 145 (node BOT-C-A 314) are accessed to retrieve asCaseList 532f, 150. The contents of location 150 (node BOT-C-A-T 316) are accessed to retrieve asCaseList 548f, 155. The contents of location 155 (node BOT-C-A-T-EOT 318) are accessed to retrieve asCaseList 572f. Because asCaseList 572f is the null pointer, the end product has been reached.

Next location 175 is accessed, which contains node BOT-T-A 705. Node BOT-T-A 705 is the first node in the second branch of interlocking trees datastore 700a that includes the letter "A". To find the end product formed, the asCase branch (e.g., in this example, the branch containing node BOT-T 703, node BOT-T-A 705, node BOT-T-A-B 707 and node BOT-T-A-B-EOT 709), the asCase links of the branch are followed by iteratively retrieving the asCaseList of the node until the asCaseList retrieved is null. For example, to determine that the second word containing dataset element A 304 is "TAB", asCaseList 740f of node BOT-T-A-B 707 is accessed to retrieve the location 185. The contents of location 185 are accessed to retrieve asCaseList 748f. Because asCaseList 748f is the null pointer, the end product has been reached.

Once again referring to FIG. 7a, now suppose that the first nodes of all asCase branches containing the letters "A" and "T" are desired. As described previously, elemental root node A 304 is retrieved from memory and its asResultList 542f is accessed to return the locations 145 and 175. First location 145 is accessed, which contains node BOT-C-A 314. Node BOT-C-A 314 is the first node in the first branch of interlocking trees datastore 700a that includes the letter "A". To find the end product formed, the asCase branch (e.g., in this example, the branch containing node BOT-C 312, node BOT-C-A 314, node BOT-C-A-T 316 and node BOT-C-A-T-EOT 318), the asCase links of the branch are followed by iteratively retrieving the asCaseList of the node until the asCaseList retrieved is null. For example, to determine that the first word containing dataset element A 304 is "CAT", asCaseList 740f of node BOT-C-A 314 is accessed to retrieve the location 145. The contents of location 145 (node BOT-C-A 314) are accessed to retrieve asCaseList 532f, 150. The contents of location 150 (node BOT-C-A-T 316) are accessed to retrieve asCaseList 548f, 155. The contents of location 155 (node BOT-C-A-T-EOT 318) are accessed to retrieve asCaseList 572f. Because asCaseList 572f is the null pointer, the end product has been reached. End product node BOT-C-A-T-EOT 318 contains dataset element A.

Next location 175 is accessed, which contains node BOT-T-A 705. Node BOT-T-A 705 is the first node in the second branch of interlocking trees datastore 700a that includes the letter "A". To find the end product formed, the asCase branch (e.g., in this example, the branch containing node BOT-T 703, node BOT-T-A 705, node BOT-T-A-B 707 and node BOT-T-A-B-EOT 709), the asCase links of the branch are followed by iteratively retrieving the asCaseList of the node until the asCaseList retrieved is null. For example, to determine that the second word containing dataset element A 304 is "TAB". asCaseList 740f of node BOT-T-A-B 707 is accessed to retrieve the location 185. The contents of location 185 are accessed to retrieve asCaseList 748f. Because asCaseList 748f is the null pointer, the end product has been reached. End product node BOT-T-A-B-EOT 709 contains dataset element A.

Next, elemental root node T 308 is retrieved from memory and its asResultList 558f is accessed to return the values 150 and 170. First location 150 is accessed, which contains node BOT-C-A-T 316. Node BOT-C-A-T 316 is the first node in the first branch of interlocking trees datastore 700a that includes the letter "T". To find the end product formed, the asCase branch (e.g., in this example, the branch containing node BOT-C 312, node BOT-C-A 314, node BOT-C-A-T 316 and node BOT-C-A-T-EOT 318), the asCase links of the branch are followed by iteratively retrieving the asCaseList of the node until the asCaseList retrieved is null. For example, to determine that the first word containing indivisible elemental unit T 308 is "CAT", asCaseList 532f of node BOT-C-A 314 is accessed to retrieve the location 145. The contents of location 145 (node BOT-C-A 314) are accessed to retrieve asCaseList 532f, 150. The contents of location 150 (node BOT-C-A-T 316) are accessed to retrieve asCaseList 548f, 155. The contents of location 155 (node BOT-C-A-T-EOT 318) are accessed to retrieve asCaseList 572f. Because asCaseList 572f is the null pointer, the end product has been reached. End product node BOT-C-A-T-EOT 318 contains dataset element T.

Next location 170 is accessed, which contains node BOT-T 703. Node BOT-T 703 is the first node in the second branch of interlocking trees datastore 700a that includes the letter "T". To find the end product formed, the asCase branch (e.g., in this example, the branch containing node BOT-T 703, node BOT-T-A 705, node BOT-T-A-B 707 and node BOT-T-A-B-EOT 709), the asCase links of the branch are followed by iteratively retrieving the asCaseList of the node until the asCaseList retrieved is null. For example, to determine that the second word containing dataset element T 308 is "TAB", asCaseList 740f of node BOT-T-A-B 707 is accessed to retrieve the location 185. The contents of location 185 are accessed to retrieve asCaseList 748f. Because asCaseList 748f is the null pointer, the end product has been reached. End product node BOT-T-A-B-EOT 709 contains dataset element T. Thus the end products containing both A and T comprise the intersection of the sets of end products containing A with the set of end products containing T, or, in this case: BOT-C-A-T-EOT 318 and BOT-T-A-B-EOT 709.

In one embodiment of the invention, the retrieved information is displayed or printed. To display or print the retrieved information, the asCase tree is followed backwards from the end product to the beginning (BOT). At each node along the asCase tree, the Result pointer (which points to the second portion from which the node was derived) is used to determine what the elemental root node represented. If the interlocking trees datastore comprises more than one level, the Result pointer points to an end product of the lower level and the same process must be followed until the elemental root nodes of the lowest level is retrieved.

Referring now to FIG. 10, suppose the total number of units sold on Tuesday are desired. It will be apparent to one of skill in the art that, instead of traversing all the nodes in the entire datastore, in one embodiment of the invention, retrieving this information requires only the retrieval of the asResultLists of elemental root nodes 1006 and 1008. Branch 5 1010 is traversed because node 1004 is pointed to by the elemental node representing Tuesday 1006 and because node 1026 is pointed to by the elemental node representing sold 1008, and branch 4 1012 is traversed because node 1028 is pointed to by the elemental node representing sold 1008. Branches 1 1015, 2 1014 and 3 1013 do not have to be traversed. The intersection of the sets of end products returned from following branches pointed to by elemental nodes 1006 and 1008 comprises node 1030 representing Bill Tuesday 40 sold PA.

The number of units sold may be determined by following the pointers from node 1024 to the root node representing the number 40 (not shown). It will be understood that this step can be performed after the intersection of end products is found or this information may be retrieved and stored as the branch is traversed.

The methods and system described above may be embodied in the form of program code (i.e., instructions) stored on a computer-readable medium, such as a floppy diskette, CD-ROM, DVD-ROM, DVD-RAM, hard disk drive, or any other machine-readable storage medium, wherein, when the program code is loaded into and executed by a machine, such as a computer, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code may be implemented in a high level programming language, such as, for example, C, C++, or Java. Alternatively, the program code may be implemented in assembly or machine language. In any case, the language may be a compiled or an interpreted language.

It is noted that the foregoing examples have been provided merely for the purpose of explanation and are in no way to be construed as limiting of the present invention. For example, the interlocking trees datastore can be implemented using object-oriented technologies, procedural technologies, a hybrid thereof or any other suitable methodology. Furthermore, although the examples presented show the dataset elements stored in a memory, one of skill in the art will understand that this functionality can be implemented in many different ways. For example, the invention contemplates the use of many different sets of dataset elements of many different universes stored on multiple remotely located machines.

What is claimed is:

1. A system for representing data, comprising:
at least one processor;
memory operatively coupled to said at least one processor; and
a program for providing nodes in an interlocking trees datastore, the interlocking trees datastore comprising root nodes and non-root nodes organized into a plurality of connected trees, the plurality of connected trees comprising an asCase tree comprising a first root and at least one of a plurality of non-root nodes, the at least one non-root node comprising a first Case node and at least one of a plurality of asResult trees, the at least one asResult tree comprising a second root node and at least one of a plurality of non-root nodes common with the nodes of the asCase tree, the at least one non-root node common with the nodes of the asCase tree comprising a first Result node, the nodes of the interlocking trees datastore including at least one elemental node representing a dataset element, at least one non-root node, the at least one non-root node comprising a first subcomponent node and at least one end product node, each node in the interlocking trees datastore comprising a Case pointer pointing to a first portion of a non-root node, a Result pointer pointing to a second portion of the non-root node, a pointer to an asCase list, the asCase list comprising a linked list of nodes for which the node is a first portion and a pointer to an asResult list, the asResult list comprising a linked list of non-root nodes for which the node is a second portion,
wherein said first subcomponent node (i) represents a logical relationship between said first Case node and said first Result node in accordance with said data and (ii) is adapted to serve as a second Case node.

2. The system for representing data of claim 1, further comprising:
a second Result node; and
a second subcomponent node, wherein said second subcomponent node represents a logical relationship between said first subcomponent node serving as said second Case node and said second Result node.

3. The system for representing data of claim 2, wherein said first Result node differs from said second Result node.

4. The system for representing data of claim 2, wherein said first Result node further comprises a root node.

5. The system for representing data of claim 1, wherein said first Result node comprises an end of thought node.

6. The system for representing data of claim 1, wherein said first Case node comprises a beginning of thought node.

7. The system for representing data of claim 1, further comprising a bidirectional link between said first Case node and said first subcomponent node.

8. The system for representing data of claim 7, further comprising a pointer pointing from said first subcomponent node to said first case node.

9. The system for representing data of claim 8, further comprising a pointer pointing from said first case node to said first subcomponent node.

10. The system for representing data of claim 7, further comprising a pointer from said first Case node to said first subcomponent node.

11. The system for representing data of claim 10, including a plurality of subcomponent nodes wherein said first Case node comprises an asCase list of pointers pointing to said plurality of subcomponent nodes.

12. The system for representing data of claim 1, further comprising a bidirectional link between said first Result node and said first subcomponent node.

13. The system for representing data of claim 12, further comprising a pointer pointing from said first subcomponent node to said first Result node.

14. The system for representing data of claim 13, further comprising a pointer pointing from said first Cast node to said first Result node.

15. The system for representing data of claim 13, further comprising a pointer pointing from said first Result node to said first subcomponent node.

16. The system for representing data of claim 15, including a plurality of subcomponent nodes wherein said first Result node further comprises an asResult list of pointers to subcomponent nodes.

17. The system for representing data of claim 1, including a plurality of subcomponent nodes further comprising a plurality of bidirectional links between said first Case node and said plurality of subcomponent nodes.

18. The system for representing data of claim 1, further comprising forming a data structure in accordance with said second Case node.

19. The system for representing data of claim 5, wherein said end of thought node is adapted to serve as a further Case node.

* * * * *